(12) United States Patent
Wallace

(10) Patent No.: US 11,506,147 B2
(45) Date of Patent: Nov. 22, 2022

(54) LINEAR THROTTLING HIGH REGRESSION RATE VORTEX FLOW FIELD INJECTION SYSTEM WITHIN A HYBRID ROCKET ENGINE

(71) Applicant: ROCKET CRAFTERS PROPULSION LLC, Cocoa, FL (US)

(72) Inventor: Kineo M. Wallace, Cocoa, FL (US)

(73) Assignee: VAYA SPACE INC., Cocoa, FL (US)

( * ) Notice: Subject to any disclaimer, the term of this patent is extended or adjusted under 35 U.S.C. 154(b) by 199 days.

(21) Appl. No.: 16/550,063

(22) Filed: Aug. 23, 2019

(65) Prior Publication Data
US 2020/0063692 A1 Feb. 27, 2020

Related U.S. Application Data

(60) Provisional application No. 62/722,027, filed on Aug. 23, 2018.

(51) Int. Cl.
| | | |
|---|---|---|
| *F02K 9/72* | (2006.01) | |
| *F02K 9/52* | (2006.01) | |
| *B64G 1/40* | (2006.01) | |
| *F16K 11/04* | (2006.01) | |
| *F16K 1/54* | (2006.01) | |

(52) U.S. Cl.
CPC ............... *F02K 9/72* (2013.01); *B64G 1/404* (2013.01); *F02K 9/52* (2013.01); *F16K 1/54* (2013.01); *F16K 11/04* (2013.01)

(58) Field of Classification Search
CPC ... F02K 9/72; F02K 9/52; B64G 1/404; F16K 1/54; F16K 11/04; F16K 31/02; F16K 31/12
See application file for complete search history.

(56) References Cited

U.S. PATENT DOCUMENTS

| | | | | |
|---|---|---|---|---|
| 3,079,952 | A | * | 3/1963 | Miller ................... F16K 31/404 |
| | | | | 251/38 |
| 3,166,898 | A | | 1/1965 | Hoeptner |
| | | | (Continued) | |

OTHER PUBLICATIONS

Valtorc, Difference Between An electric and pneumatic actuator, Apr. 16, 2014, Valtorc.com (Year: 2014).*

*Primary Examiner* — Todd E Manahan
*Assistant Examiner* — Kyle Robert Thomas
(74) *Attorney, Agent, or Firm* — Birch, Stewart, Kolasch & Birch, LLP

(57) ABSTRACT

A hybrid rocket engine with a vortex flow field injection system that produces a high-speed sustained vortex flow field is described. The hybrid rocket engine includes a generally cylindrical injection chamber with an inner circumference to comprise an outer edge of a solid propellant grain in the hybrid rocket engine. The engine also includes an injection system that has a throttle valve and an injector that injects injection fluid into the engine and produces a vortex flow-field for the injected fluid. The injector includes at least one primary feed line that distributes the injection fluid throughout a pre-swirl chamber and multiple orifices along an inner edge of the injection chamber. The pre-swirl chamber connects to the injection chamber and at least one of the primary feed lines and redirects a primary fluid flow of the injected fluid from a primary axial direction to a centrifugal direction.

21 Claims, 18 Drawing Sheets

(5 of 18 Drawing Sheet(s) Filed in Color)

(56) References Cited

U.S. PATENT DOCUMENTS

| | | | | |
|---|---|---|---|---|
| 3,426,534 A * | 2/1969 | Murphy | .................... | F02K 9/56 |
| | | | | 60/258 |
| 3,555,824 A * | 1/1971 | Buse | ........................ | F02K 9/62 |
| | | | | 60/220 |
| 3,789,610 A | 2/1974 | Stone | | |
| 4,424,679 A | 1/1984 | Holzman | | |
| 5,101,623 A * | 4/1992 | Briley | ........................ | F02K 9/72 |
| | | | | 239/132 |
| 5,119,627 A | 6/1992 | Bradford et al. | | |
| 5,582,001 A * | 12/1996 | Bradford | .................. | F02K 9/72 |
| | | | | 60/207 |
| 6,865,878 B2 | 3/2005 | Knuth et al. | | |
| 8,887,183 B2 | 11/2014 | Matsumura et al. | | |
| 9,453,479 B1 | 9/2016 | Jones | | |
| 9,822,045 B2 | 11/2017 | Jones | | |
| 9,890,091 B2 | 2/2018 | Jones | | |
| 10,286,599 B2 | 5/2019 | Jones | | |
| 10,309,346 B2 | 6/2019 | Jones | | |
| 2004/0055277 A1* | 3/2004 | Kline | ....................... | F02K 9/94 |
| | | | | 60/251 |
| 2008/0111089 A1* | 5/2008 | Hasunuma | ................ | F16K 1/54 |
| | | | | 251/122 |
| 2010/0264240 A1* | 10/2010 | Gotzig | ...................... | F02K 9/52 |
| | | | | 239/543 |
| 2017/0292629 A1* | 10/2017 | Dolenti | .................. | G01D 5/202 |

\* cited by examiner

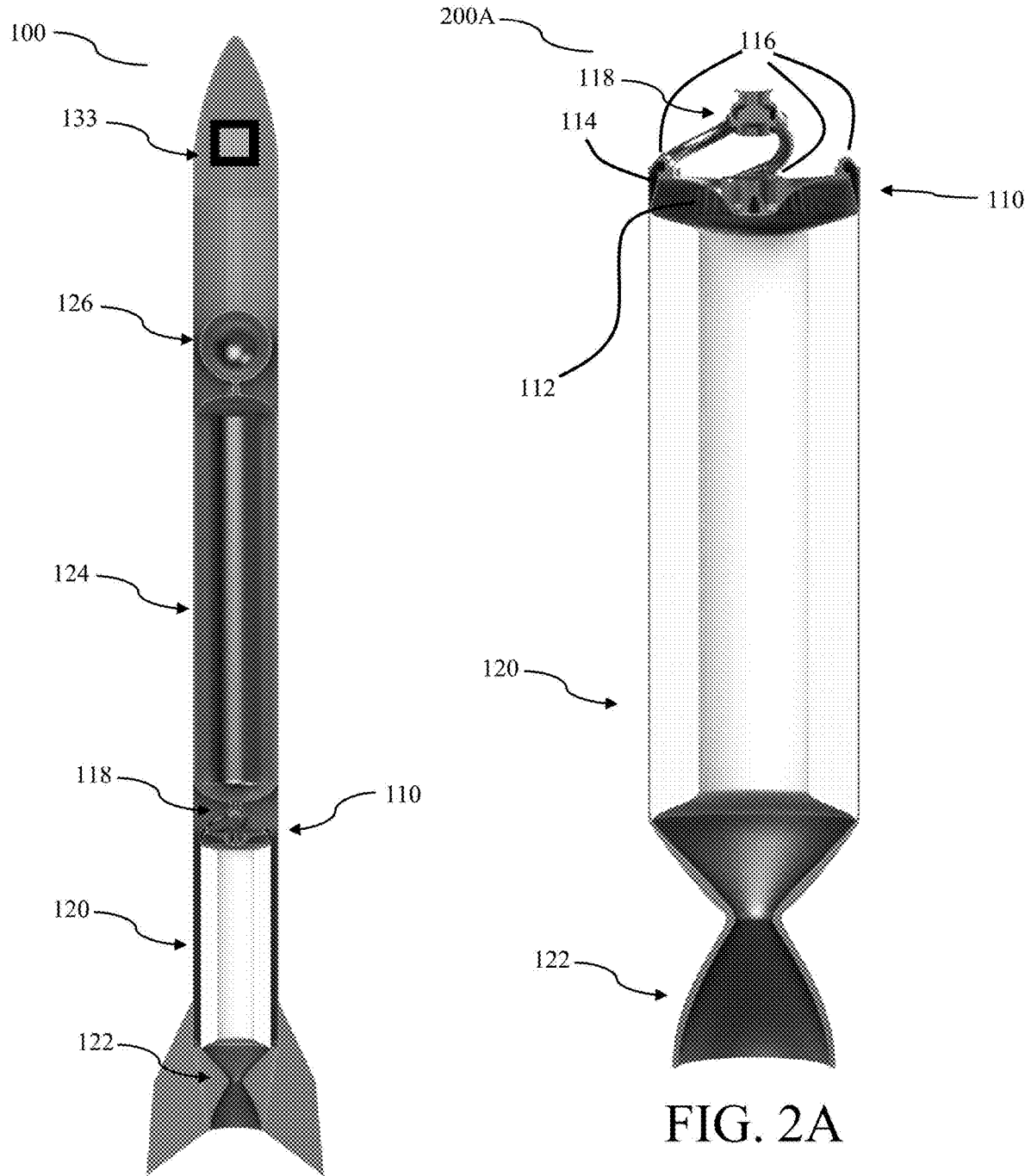

LINEAR THROTTLING HIGH REGRESSION RATE VORTEX FLOW FIELD INJECTION SYSTEM WITHIN A HYBRID ROCKET ENGINE

CROSS-REFERENCE TO RELATED APPLICATIONS

This application claims the benefit under 35 U.S.C. § 119(e) of the filing date of U.S. Patent Application No. 62/722,027, for HIGH CENTRIFUGAL VORTEX FLOW-FIELD INJECTOR FOR HYBRID ROCKET ENGINES, which was filed on Aug. 23, 2018, and which is incorporated here by reference.

BACKGROUND

This specification relates to engine throttling and injection as well as describing a hybrid rocket engine that uses an induced self-sustaining vortex flow field coupled with improved valving to increase combustion stability and regression rate.

When launching spacecraft into orbit, rocket scientists typically use one of three primary types of chemical rockets, i.e., solid propellant, liquid propellant, or hybrid designs that use a solid propellant with a liquid or gaseous reactant. Each of these types have their benefits and limitations. For example, solid propellant engines have the greatest thrust-to-weight ratio as well as the greatest simplicity. However, these engines are not very efficient. Liquid propellant engines have a lower thrust-to-weight ratio and are the most complicated of the three types of chemical rockets. Even so, they have a much higher efficiency than solid propellant engines. Hybrid engines share the simplicity and high thrust-to-weight ratio with solid propellant engines. They also have the ability to throttle and maintain a high efficiency like that of a liquid propellant engine.

Throttleability is the ability to adjust the thrust of an engine by varying the flow of combustion reactants. Throttling is usually achieved by increasing or decreasing the flow of liquid or gaseous components of reactants into the engine.

Liquid engine throttling is traditionally achieved by increasing or decreasing speed of turbopumps in the engine. Hybrid engines are usually throttled by actuating a control valve that adjusts the flow of liquid reactant component into the engine since these types of engines traditionally use differential pressure instead of turbopumps to pressurize the engine.

Traditional throttling systems use ball valves, globe valves, or pintle injectors for on-off and throttling. Ball valves use a rotating ball with a hole through the ball that allows straight through flow in an open position and shuts off flow when the ball is rotated 90 degrees to block the flow passage. Globe valves consist of movable disk-type elements and stationary ring seats in generally spherical bodies. An opening in a globe valve forms a seat onto which a movable plug can be screwed in to close the valve. Pintle injectors consist of two concentric tubes and a central protrusion. A first propellant, e.g., an oxidizer, flows through an outer tube while a second propellant, e.g., fuel, flows within an inner tube and impinges on a central pintle-shaped protrusion. Throttleability can be obtained by either placing valves before the injector, or by moving the inner pintle or outer sleeve.

However, these customary throttling systems have problems when used with Nitrous Oxide due to the tendency of Nitrous Oxide to disassociate or break into Nitrogen and Oxygen at dangerously high pressures over sources of large pressure drops or flow turbulence. These systems also do not allow for fine throttle control along with efficient and safe combustion. For example, a system using a ball valve does not influence the flow rate in a linear rate, but uses an exponential rate instead. This exponential rate causes problems when a throttling system tries to finely adjust the flow rates of the engine to finely control a rocket either during flight or during orbital maneuvers.

Globe valves have issues with pressure drops and flow turbulence.

Pintle valves can be used for minor flow adjustments. They also have more linear flow curves unlike of ball valves. However, pintle valves have pressure drop issues where the pressure drops over valve changes when the valves are actuated. In addition, in order to use a pintle valve with a hybrid engine, the valve itself must be an injector to prevent dissociation due to turbulent flow patterns. This is because the injector causes ineffectiveness of atomization and flow incompatibilities when used in hybrid combustion systems.

A traditional hybrid rocket engine uses one of these valves in axial oxidizer injection systems where an oxidizer is injected into the central axis of the engine and either sends the oxidizer directly down a central port with an injector or at a slight angle to induce a swirl. Flow directly along a central axis causes buildup of a large boundary layers between a flame wall and a wall of a fuel grain. The larger boundary layer slows the heat transfer from a combustion reaction to the fuel grain. Therefore, hybrid engines have significantly lower regression rates than that of solid rocket engines.

To increase the regression rate of hybrid engines, researchers have been adding a twist to the axial flow so that the flow has a spiraling pattern. However, current swirl designs do not induce a fully sustaining vortex flow path and the swirl degrades down the length of the central port. This twist is in the flow and is not strong enough to sustain itself throughout the entire length of an engine when producing orbital class engines.

The injection systems also require that the injector be placed at the exact center of a forward cap which is the cap over the grain opposite the nozzle along the grain's axis. The injector then distributes oxidizer down the port like that of the flow of water through a shower head. When the injector is placed at the center of the forward section of the engine, the injector restricts the placement of other hardware, requiring it to be off center from the central axis. An ignition system of the engine is significantly affected because the ignition system is placed into the forward section of the engine and is pushed off to the side of an oxidizer injection manifold. In this design, the central port of the engine is not heated evenly, and instead, hotspots are produced throughout the fuel grain. This uneven heating can lead to an unstable ignition of the engine and, in some engine designs, unstable combustion can cause fuel slivers to break off from the fuel grain. These slivers can get stuck in the throat of the nozzle and cause the engine to over pressurize and explode. In addition, the ignition system is not easily configured for multiple reignition events and the engine needs a mechanical system to prevent backflow of combustion products into the ignition system.

The disclosure in Bradford et al., "Hybrid Rocket Combustion Enhancement." U.S. Pat. No. 5,582,001, issued Dec. 10, 1996 contemplates stabilizing the combustion of hybrid rocket engines by preheating the oxidizer through a continuous injection of hypergolic fluid into the injection chamber to increase the temperature of the oxidizer. However, the addition of hypergolic fluid detracts from the overall safety of the hybrid engine due to its toxicity, explosive potential, and added complexity to the engine. Therefore, using hypergolic fluid has problems when used to preheat the injected oxidizer before the oxidizer mixes with fuel.

In traditional hybrid rocket engines, over the time of the burn and during throttling, the combustion reaction experiences a change in the oxidizer/fuel mixing ratio ("O/F shift"). This O/F shift is a change in the oxidizer to fuel ratio over the duration of an engine's active cycle due to changes in fuel and oxidizer flow rates from throttling and/or the change in area of a grain port during the consumption of the grain during the grain burn. When a hybrid engine is throttled, the flow rate of oxidizer is changed. This flow rate changes the O/F ratio because the fuel consumption rate known as the regression rate does not change linearly with the change in oxidizer flow. In addition, as the engine burns over time, the exposed area of the port increases which increases the amount of fuel exposed to the flame wall. This process results in more fuel being consumed, also causing an O/F shift. When an engine experiences an O/F shift, the engine's efficiency decreases as the combustion reactants react most efficiently as a specific mixture ratio. Anything other than the specific mixture ratio decreases the efficiency and wastes propellant.

These problems are addressed by the improved vortex flow field, improved valve and improved hybrid engine disclosed in the present application.

SUMMARY

In general, one innovative aspect of the subject matter described in this specification can be embodied in a hybrid rocket engine with a vortex injector, linear throttle, and an improved vortex flow field.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

A vortex injector in a hybrid rocket engine may include one or more primary feed lines that receive axial flow of an injection fluid, one or more injection orifices that distribute injection fluid to an injection chamber, a pre-swirl chamber that transforms axial flow of the injection fluid into a centrifugal flow and distributes the centrifugal flow of the injection fluid to the one or more injection orifices, and an interface that routes the axial flow of the injection fluid from the one or more primary feed lines to a pre-swirl chamber.

The interface between the one or more primary feed lines and the pre-swirl chamber may begin redirection of the axial flow of the injection fluid to an off-axis flow.

The one or more injection orifices may atomize the injection fluid.

The injector may include a central truncated spike.

The injector may include a central hole for installation of at least one enhancer for enhancing hardware.

A second embodiment may be a linear throttle valve in a hybrid rocket engine. The throttle valve may include a generally cylindrical piston that actuates up and down in a linear manner in line with an axis of inlet flow for injection fluid and a generally cylindrical chamber connected to the piston that redirects the injected fluid. By linearly actuating the cylindrical piston, the injection fluid may change its volumetric rate in a linear relation to the cylindrical piston's position.

The cylindrical piston may be actuated with a pneumatic system. The cylindrical piston may be actuated with an electric motor.

The valve may be positioned in line with a flow inlet axis. The valve may be coupled with a vortex injector. At least one output port of the linear throttle valve may be positioned so that at least one outlet port redirects injection fluid flow to at least one inlet of the vortex injector.

A third embodiment is a hybrid rocket engine with a vortex flow field injection system that produces a high-speed sustained vortex flow field. The hybrid rocket engine may include a generally cylindrical injection chamber that has an inner circumference to comprise an outer edge of a solid propellant grain in the hybrid rocket engine. The engine may also include an injection system that has a throttle valve and an injector that injects injection fluid into the engine and produces a vortex flow-field for the injected fluid. The injector may include one or more primary feed lines that distribute the injection fluid throughout a pre-swirl chamber and multiple orifices along an inner edge of the injection chamber. The orifices may be generally tangential to a primary axis and the injection chamber. The pre-swirl chamber may connect to the injection chamber and at least one primary feed line and redirect a primary fluid flow of the injected fluid from a primary axial direction to a centrifugal direction.

Each orifice may have a converging section, a diverging section, or both a converging section and a diverging section.

The cylindrical injection chamber may be closed off at the top of the chamber with a conical spike at the center of the chamber to direct centrifugal flow ejected from the orifices down the primary axis of the engine.

The cylindrical injection chamber may be closed off at the top of the chamber with a truncated conical spike at the center of the chamber to direct the centrifugal flow ejected from the orifices down the primary axis of the engine.

The spike may have a hole passing through it to allow for the insertion of an ignition system, a preheater, or installation of at least one other enhancer for enhancing hardware.

Multiple orifices may be stacked on top of each other in ring layers and each ring layer of orifices may inject a different combustion reactant.

In another embodiment, a rocket may include the hybrid engine described above.

The subject matter described in this specification can be implemented in particular embodiments so as to realize one or more of the following advantages.

This specification discloses a linear throttling high regression rate vortex flow field injection system within a hybrid rocket engine. Through the use of a linear throttle, a vortex flow field can be adjusted and through a change in centrifugal forces, a change in flow rate changes a regression rate of the fuel. To induce the vortex flow, an oxidizer injector of the injection system injects atomized oxidizer at a radially tangential angle to sidewalls of a combustion port of the engine. The injector has a central flow redirection spike to encourage continued rotational flow down through a combustion chamber of the engine, increasing regression rate.

The vortex flow induces a Carnot cycle inside of an injection chamber that preheats an oxidizer for improved combustion stability as compared to prior oxidizer injection systems. A central flow redirection spike is also provided and allows for placement of an engine ignition system central to the engine.

The engine is throttled using a linear throttle valve that makes throttling the oxidizer injected into the propellant grain in a pressure fed hybrid easier to control and safer by maintaining a smooth fluid flow regardless of the throttle position through the use of a cylindrical cross-sectional area. This smooth fluid flow is the result of enabling linear changes in oxidizer injection and enhancing the stability of the flame front.

The linear throttling high regression rate vortex flow field injection system uses a differential pressure oxidizer feed system in which no moving parts are required except for a singular throttle valve. For the system to throttle an engine, the system must change the flow rate of an oxidizer as the fuel is a solid and the flow cannot be changed through mechanical systems. The flow change can occur through a control valve that uses a linear change in a cross-sectional area about a cylinder, e.g., cylindrical plunger 906 as illustrated in FIGS. 9, 10a, and 10b, as the primary flow choke point to maintain a linear change in fluid flow. The flow rate is directly proportional to the cross-sectional area of the open cylinder 1004 in FIG. 10B. For example, if the valve opens halfway, the valve will allow half of the maximum fluid flow. If the valve opens twenty percent, the valve will allow twenty percent of the maximum fluid flow. This linear flow rate is not dissimilar to a globe valve. However, a globe valve causes stagnation points and has a great effect on the pressure of the fluid flowing through the valve. As a result, the injection system of this specification uses a piston cylinder that rises into the primary flow path to choke out the flow. With the piston in line with the flow, the piston defects the flow off to the sides of the piston cylinder, e.g., the piston cylinder 906 of FIG. 10A, radially at a shallow angle with little effect to the fluid flow eliminating stagnation points and maintaining a smooth fluid flow translation. The stagnation points are further reduced by using multiple output ports after the valve in a ring around the cylinder to encourage smooth flow transition.

By preventing stagnation points and maintaining smooth translational fluid flow, the injection system greatly reduces pressure drops over the valve. The valve works as a variable venturi nozzle. The reduction of pressure drop is especially desirable for pressure fed rocket engines since the engines will perform more efficiently during throttling with a reduced pressure drop over valves. This reduction saves fuel and reduces the cost of the rocket.

The cylindrical piston valve of the injection system allows for very fine throttle control due to the variation of the piston valve's position, which has a direct relationship to the fluid flow. As a result, the valve has the potential for a fine throttling ratio that is only limited by an actuation system determined for the controller. The actuation system can be, e.g., pneumatic, induction, or screw.

The cylindrical piston control valve works in combination with a vortex flow field injector that produces vortex flow based on the flow of natural vortex phenomena such as hurricanes, tornadoes, and water drainage vortexes. Specifically, the injector uses the effects of inward spiraling flow forces self-sustaining centrifugal vortex flow.

A vortex produced by the vortex flow field injector can have a very long flow path as streamlines of the vortex are flowing almost perpendicular to a primary axis of an engine. This flow path eliminates the need for a pre-combustion chamber that is traditionally needed in hybrid rocket engines to allow for atomization of the oxidizer. Instead at the head of the engine is an injection chamber that is much shorter in length than a pre-combustion chamber in a traditional engine. In this flow path, a chemical reactant is transformed into vapor or micro-droplets while flowing in a relatively centrifugal tangential trajectory to a primary axial flow path. As a result, the axial flow path of an injected oxidizer is subsonic which allows for longer mixing time between fuel and the oxidizer inside the combustion port.

The vortex can produce higher pressure on the walls of a propellant grain, e.g., a fuel grain, within the engine due to the centrifugal forces in the flow path. Therefore, a boundary layer between a flame wall and a wall of the flame wall within the engine can be compressed and reduced in depth. By compressing the boundary layer and reducing its depth, the injection system increases the heat transfer potential between the flame wall and a grain wall that increases the total regression rate. Increasing the regression rate makes the engine more volumetrically efficient and increases thrust. When an oxidizer flow is reduced, the strength of the centrifugal flow decreases and as the flow increases, the centrifugal flow increases. Thus, the regression rate changes with the flow rate of the oxidizer, which reduces or even eliminates the O/F shift of the engine when throttling.

The vortex flow is also advantageous because as an engine continues to burn and the combustion port in a propellant grain increases in diameter, the centrifugal forces decrease. This process also decreases the regression rate further reducing or eliminating O/F shift over the duration of the burn.

At the center and top of a vortex, there is a low-pressure section much like the eye of a hurricane. This section takes advantage of the Carnot cycle to pull heat from the combustion reaction up into the injection chamber where the lower pressure system produces a circulating flow path that preheats the injected reactants in the form of a Carnot cycle making the combustion reaction more stable. This effect also forces the combustion products into the center of the vortex so that the primarily axial flow that flows towards the nozzle of the engine travels down the center of the vortex so that the axial flow does not erode the centrifugal flow.

This low-pressure section is caused by the Bernoulli effect and is in the perfect place to position an ignition system. Unlike customary engines that place igniters off to the side of a central vertical axis, the injection system contemplated by this specification injects ignition plume down into the center of a propellant grain port, heating the entire propellant grain port up to its combustion temperature. Once the fuel reaches the combustion temperature, the main oxidizer throttle valve is opened to begin the primary combustion reaction.

At the end of a combustion chamber of the engine is a nozzle structure, e.g., a traditional de Lavel nozzle, aerospike nozzle, or some other form of converging diverging nozzle structure that accelerates the speed of combustion reactant gasses past the speed of sound and harnesses their energy as thrust. In addition, the converging section of the nozzle terminates the vortex flow at the throat of the nozzle during the formation of the first Mach wave in the throat.

This process eliminates the centrifugal forces and reduces the torquing effect on the rocket from the exhaust flow.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

The patent or application file contains at least one color drawing. Copies of this patent or patent application publication with color drawing will be provided by the USPTO upon request and payment of the necessary fee.

FIG. 1 is a diagram of a hybrid rocket engine with a linear throttling high regression rate vortex flow field injection system.

FIG. 2A illustrates an enlarged view of an example engine assembly.

Like reference numbers and designations in the various drawings indicate like elements.

DETAILED DESCRIPTION

Figure 2B:
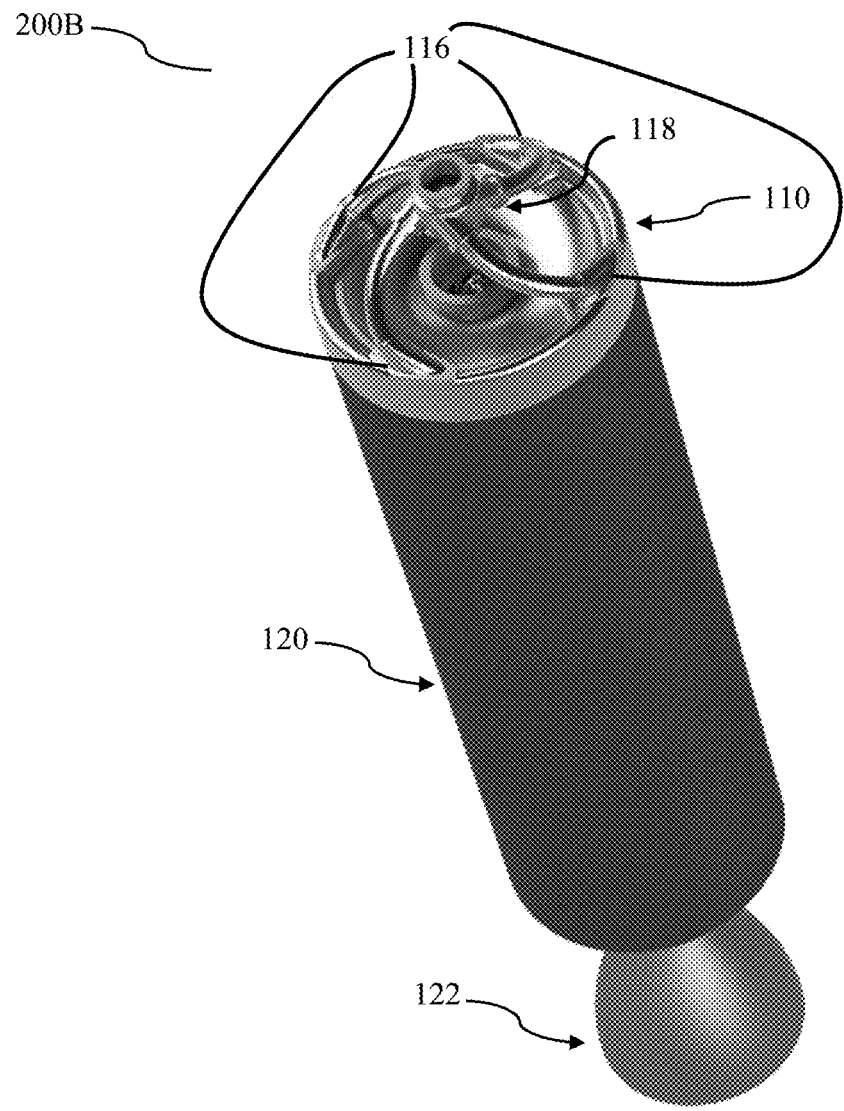
FIG. 2B illustrates an isometric view of the example engine assembly of FIG. 2A.

This specification describes a design of a throttleable hybrid rocket engine that produces a self-sustaining vortex flow pattern to slow an axial flow rate of injected fluid. This design slows axial fluid flow and increases a regression rate of a solid propellant grain in the hybrid engine, thus increasing the propellant grain's thrust and efficiency.

The design includes a linear throttling high regression rate vortex flow field injection system. FIG. 1 is a diagram of a rocket 100 that is powered by a hybrid rocket engine, which uses a linear throttling high regression rate vortex flow field injection system. The rocket is a generally cylindrical vehicle that has a generally conical nose for aerodynamics and can include fins to improve stability and control during flight in the atmosphere. The rocket 100 may also be carrying a payload 133.

As shown, in one implementation, the engine may be fed oxidizer from an oxidizer tank 124 that is pressurized with a header gas from tank 126. Although header gas is not necessary, the gas may improve engine efficiency by maintaining a consistent pressure inside the oxidizer tank 124. In one implementation, oxidizer flows from the oxidizer tank 124 through an injection system that includes a linear throttle valve 118 and an injector 110. The injector 110 produces a vortex flow-field by translating the oxidizer flow into a centrifugal path within a pre-swirl chamber. The oxidizer then flows through injection orifices and to a propellant grain 120. This flow path forces a flame wall closer to the walls of the propellant grain 120, e.g., fuel grain, and increases a regression rate of the propellant grain.

The injection system may induce a vortex flow using flow effects observed in nature to influence the flow path and the mixing of combustion reactants and products. The created vortex may produce two different zones inside of the engine, e.g., engine 100, one in which high axial speed combustion products are forced into a center of the vortex and a second in which lower axial speed, high centrifugal speed reactants mix on an outer section of the vortex. This flow pattern encourages combustion reaction between fuel and an oxidizer to occur as close to a wall of the propellant grain as possible to increase the regression rate of the propellant grain.

After reaction, the linear throttling high regression rate vortex flow field injection system may force the flow into the center of the vortex as the flow flows down towards a nozzle 122 of the engine before being ejected and producing thrust. After combustion, the reactants, e.g., the fuel and oxidizer, from the reaction flow through a nozzle 122. The axial velocity of the reactants is relatively low, increasing the total amount of time that the reactants are in the engine, which allows for a more complete combustion reaction between the reactants, e.g., the fuel and oxidizer. This process increases the efficiency of the engine as well as increases the thrust since the reactants react homogeneously with each other and directly flow through the center of the vortex.

Although FIG. 1 is described with respect to injecting oxidizer to mix with fuel, other implementations are contemplated as "reverse hybrid" engines in which a solid oxidizer replaces the solid fuel grain and liquid or gaseous fuel is contained in a tank, e.g., tank 124. The liquid fuel is then injected into the engine 100 and mixes with the solid oxidizer. For example, Potassium Nitrate can be used as a solid oxidizer with hydrogen, rocket propellant one (RP1), methane, or another material as the fuel. See, for example, Johansson, Reed H., (2012). "Investigation of Solid Oxidizer and Gaseous Fuel Combustion Performance Using an Elevated Pressure Counterflow Experiment and Reverse Hybrid Rocket Engine." The Pennsylvania State University, State College, Pa. The throttle and injector can also be applied to liquid bi-propellent or tri-propellent engines that use differential pressure in place of turbopumps through the use of more pre-swirl chamber and separate throttle valves for each reactant.

FIG. 2A illustrates an enlarged view of an example engine assembly. As shown the injector 110 is composed of three components: injection orifices 112, a pre-swirl chamber 114, and primary feed lines 116. In one implementation, the injection orifices 112 may be off the primary central axis, e.g., approximately 80 degrees off the central axis, of the engine so that the orifices inject injection fluid, e.g., oxidizer or liquid fuel, perpendicular to the primary central axis of the engine. When injection fluid is injected into the injection orifices 112, the injection fluid flows through a throttle valve 118 to the injector 110 and into a propellant grain 120 and then to a nozzle 122. The injection orifices 112 may generally be cylindrical with converging and diverging sections on their fluid inlets and outlets like that of a venturi nozzle. This shape prevents unstable fluid flow and combustion. In some implementations, the orifices 112 may be other shapes, e.g., cylindrical or rectangular, that encourage injected fluid to atomize and flow in a centrifugal path. FIG. 2B illustrates an isometric view of the example engine assembly of FIG. 2A.

Figure 3:
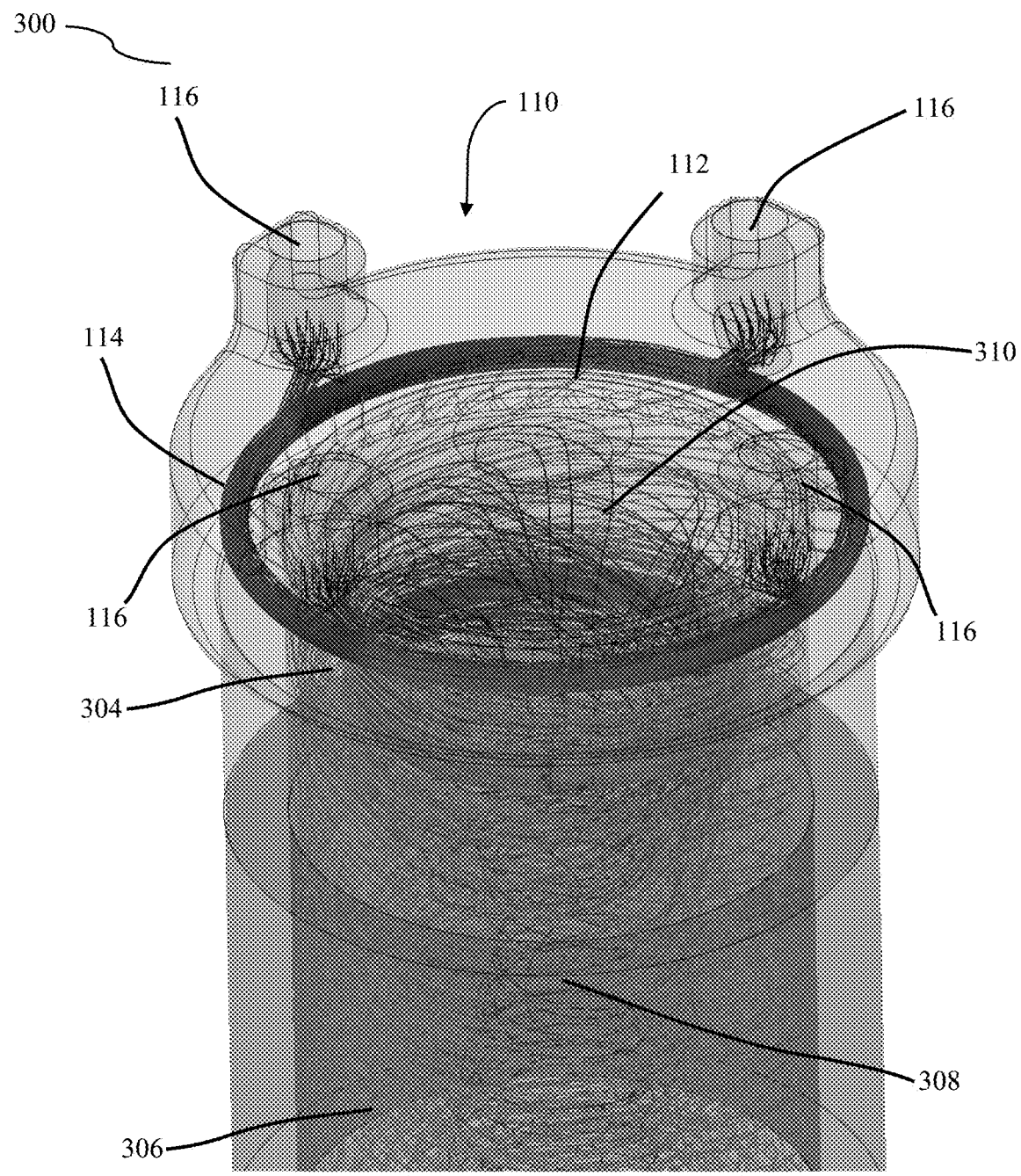
FIG. 3 illustrates an enlarged view of a linear throttling high regression rate vortex flow field injection system.

FIG. 3 illustrates an enlarged view of a linear throttling high regression rate vortex flow field injection system 300.

In one implementation, primary feed lines 116 evenly distribute injection fluid, e.g., an oxidizer or liquid fuel, throughout a pre-swirl chamber 114. As illustrated in FIG. 3, the injection system 300 contains four primary feed lines 116. However, an injection system 300 can have any number of feed lines. In an implementation, a pre-swirl chamber 114 redirects a primary fluid flow path from axial flow to centrifugal flow. The internal topology of an injector 110, a linear valve 118, and piping in the injection system 300 all help this redirection. By changing the flow path to centrifugal flow, the pre-swirl chamber 114 accelerates the flow and distributes the fluid from the flow evenly throughout the injection orifices 112 for injection.

Injection orifices 112 may approach a generally tangential injection angle to a cylindrical side wall of an injector 110. Injection fluid is injected into the injection orifices 112. In one implementation, the injector forces the injection fluid through the orifices due to the pressure differential between the pre-swirl chamber and the combustion chamber. When the injection fluid passes through the injection orifices 112, the injection system 300 atomizes the injection fluid into microdroplets or gas so that the fluid will better mix with the solid propellant grain, e.g., the solid fuel grain or the solid oxidizer, during combustion.

Once the system atomizes the injection fluid, the injection fluid may have very low axial velocity and very high centrifugal velocity as illustrated in the flow field 304. The fluid flow is in the direction of the fluid velocity. The centrifugal flow can continue down the length of the port of the propellant grain 120 with consistent sustaining flow velocities 306. At the center of the vortex flow field, the combustion products, e.g., the exhaust gasses that are the result of the combustion reaction, can lose their centrifugal flow velocity as the products transition to an axial flow in an axial flow direction 308 that flows down the central axis and is ejected out of the nozzle, e.g., nozzle 122, of the engine. In addition, at the top of the vortex flow, the system may include a Carnot cycle 310 that pulls heat from the top of the solid propellant grain, e.g., fuel grain, port up into an injection chamber 304 at the bottom of the injector 110. This process increases the temperature of the injected fluid that stabilizes the combustion reaction in the engine.

Figure 4A:
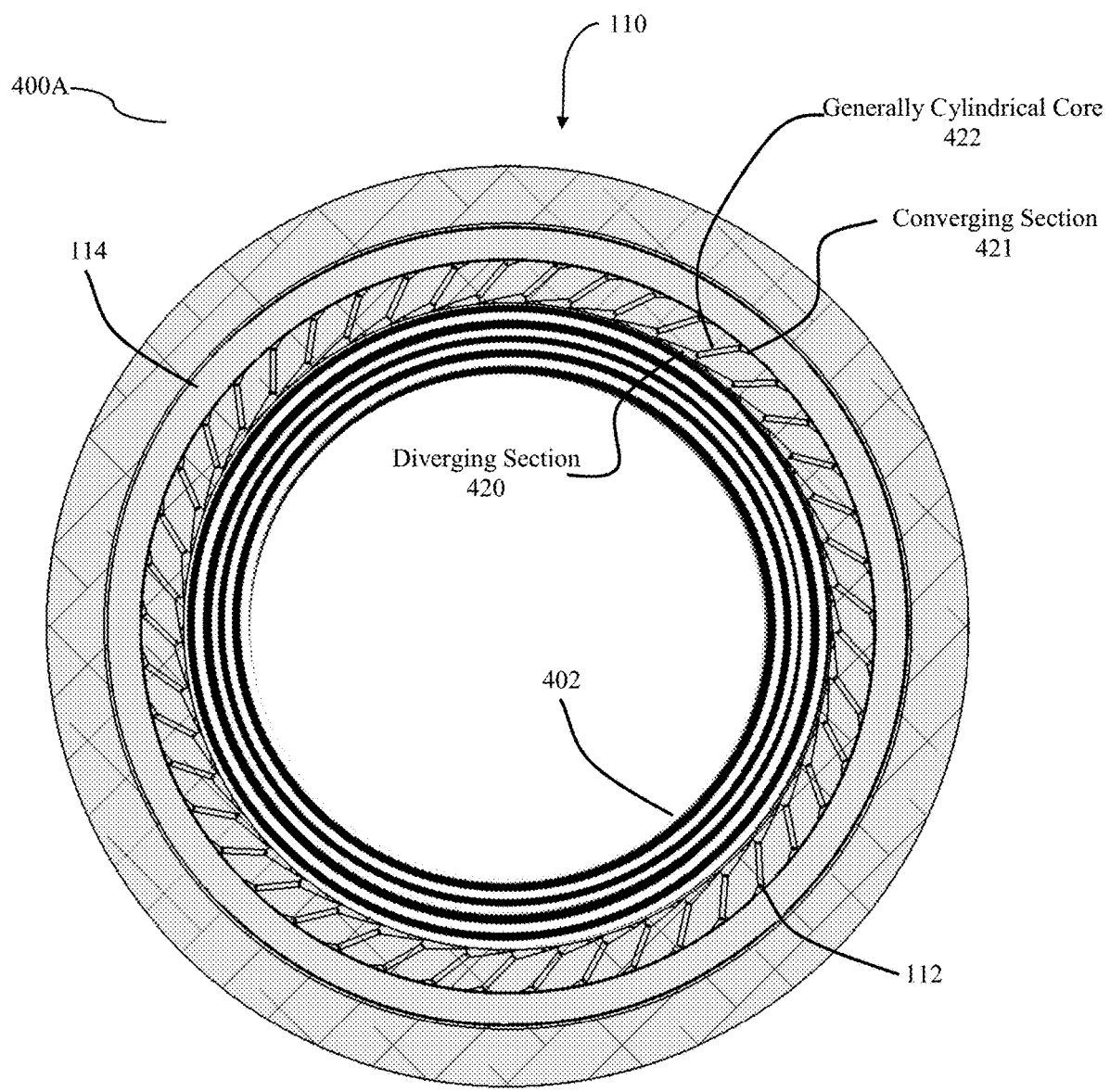
FIG. 4A illustrates a top view of a pre-swirl chamber of an injector.

FIG. 4A illustrates a top view of a pre-swirl chamber of an injector, e.g., injector 110. In an implementation, the pre-swirl chamber 114 and the injection orifices 112 redirect an injection fluid flow into a centrifugal vortex flow field. As illustrated, injection orifices 112 each have a converging section, e.g., converging section 421, and a diverging section, e.g., diverging section 420, on their inlets and outlets. These converging and diverging sections are generally tangential against an inner wall 402. These sections help injected fluid to follow a flow path. However, although they improve performance, they are not required.

Figure 4B:
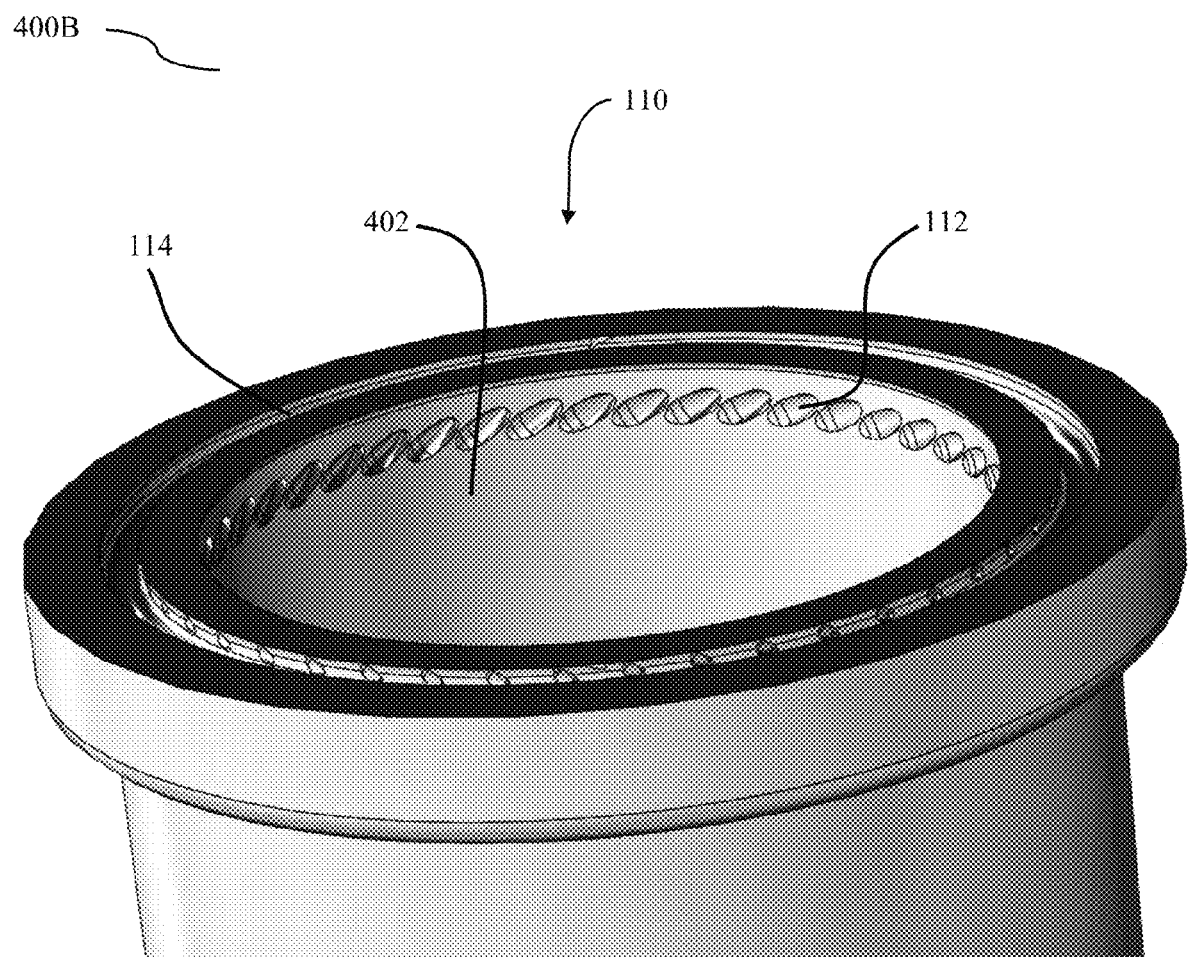
FIG. 4B illustrates a cutaway view of an injector and shows the interface between the pre-swirl chamber and the injection chamber through injection orifices.
Figure 4C:
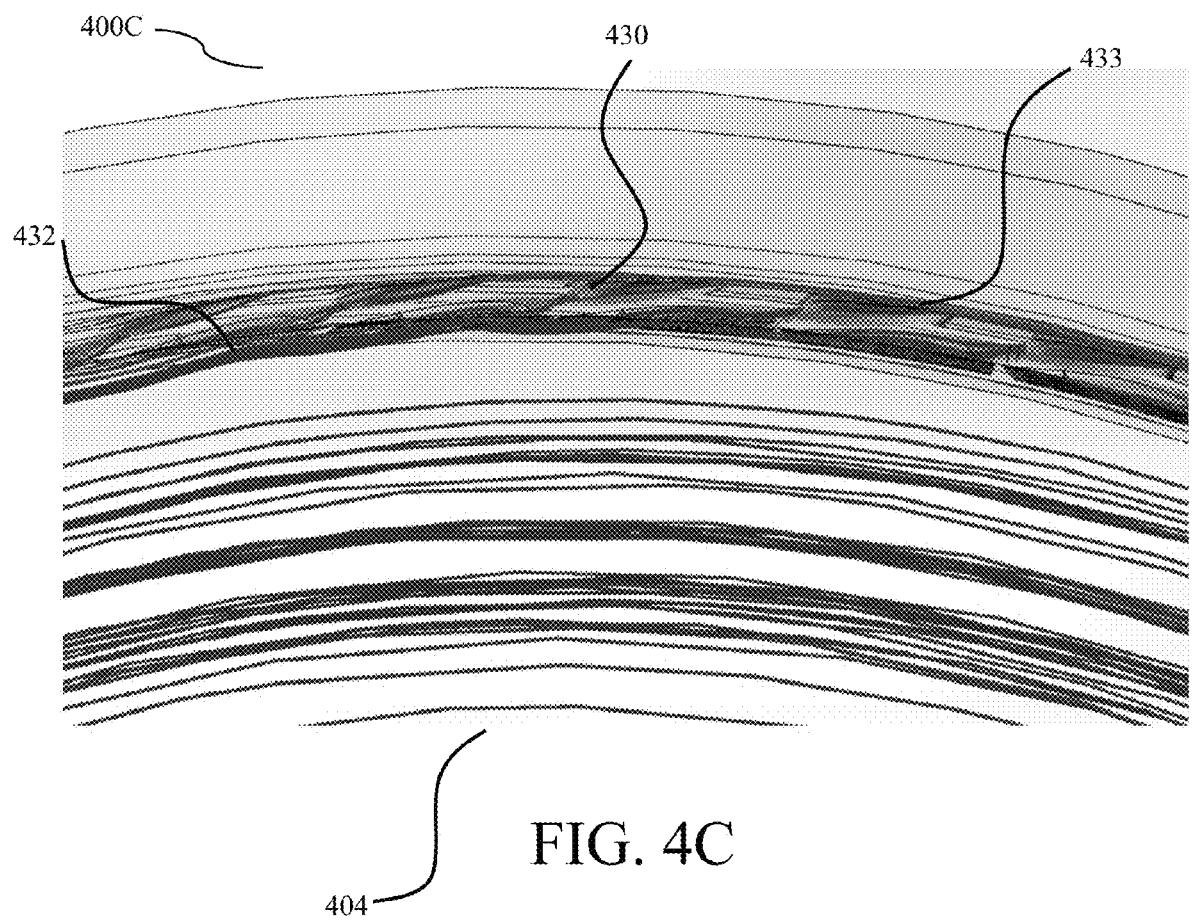
FIG. 4C illustrates a flow path of injection fluid through an injector.

FIG. 4B illustrates a cutaway view of an injector, e.g., injector 110, and shows the interface between the pre-swirl chamber and the injection chamber through injection orifices. FIG. 4C illustrates a flow path of injection fluid through an injector, e.g. injector 110. Injection fluid starts in the pre-swirl chamber 114 illustrated in as a blue flow path 433. The injection fluid then flows through into injection orifices 112 as shown in a green flow path 430. The injection fluid flows in a tangential flow pattern to the inner sidewall 402 of the injection chamber 404 as illustrated in a red flow path 432.

Figure 5:
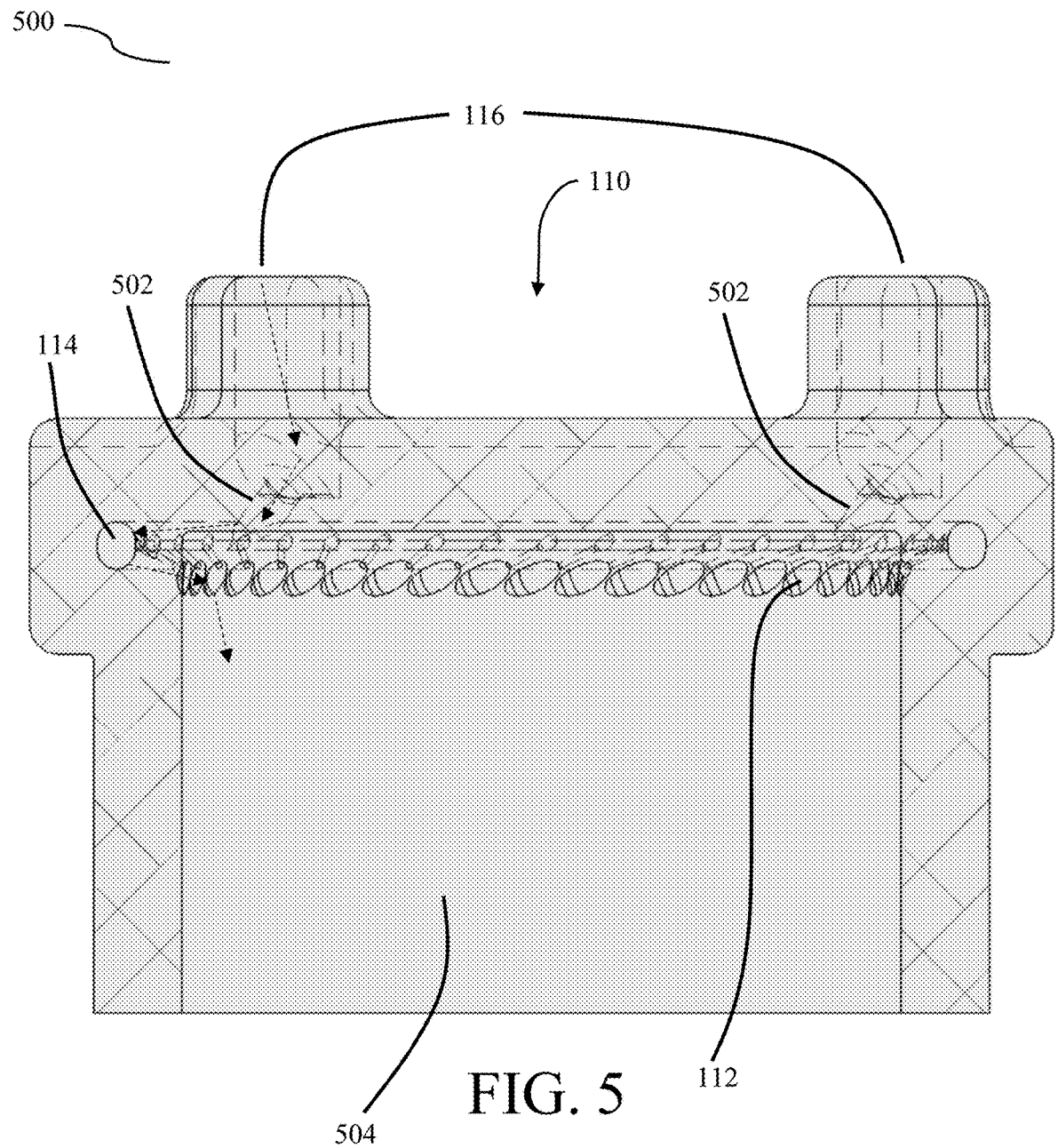
FIG. 5 illustrates a side cutaway view of an injector.

FIG. 5 is a side view of an injector 110. This view illustrates connections among the three components of the injector, e.g., injector 110. As shown, the injector has an interface 502 between primary feed lines 116 and the pre-swirl chamber 114. This interface can begin redirection of the injection fluid flow from an axial direction to an off axis flow, e.g., 45 degrees, which then can be transformed into a centrifugal flow in the pre-swirl chamber 114.

Figure 6:
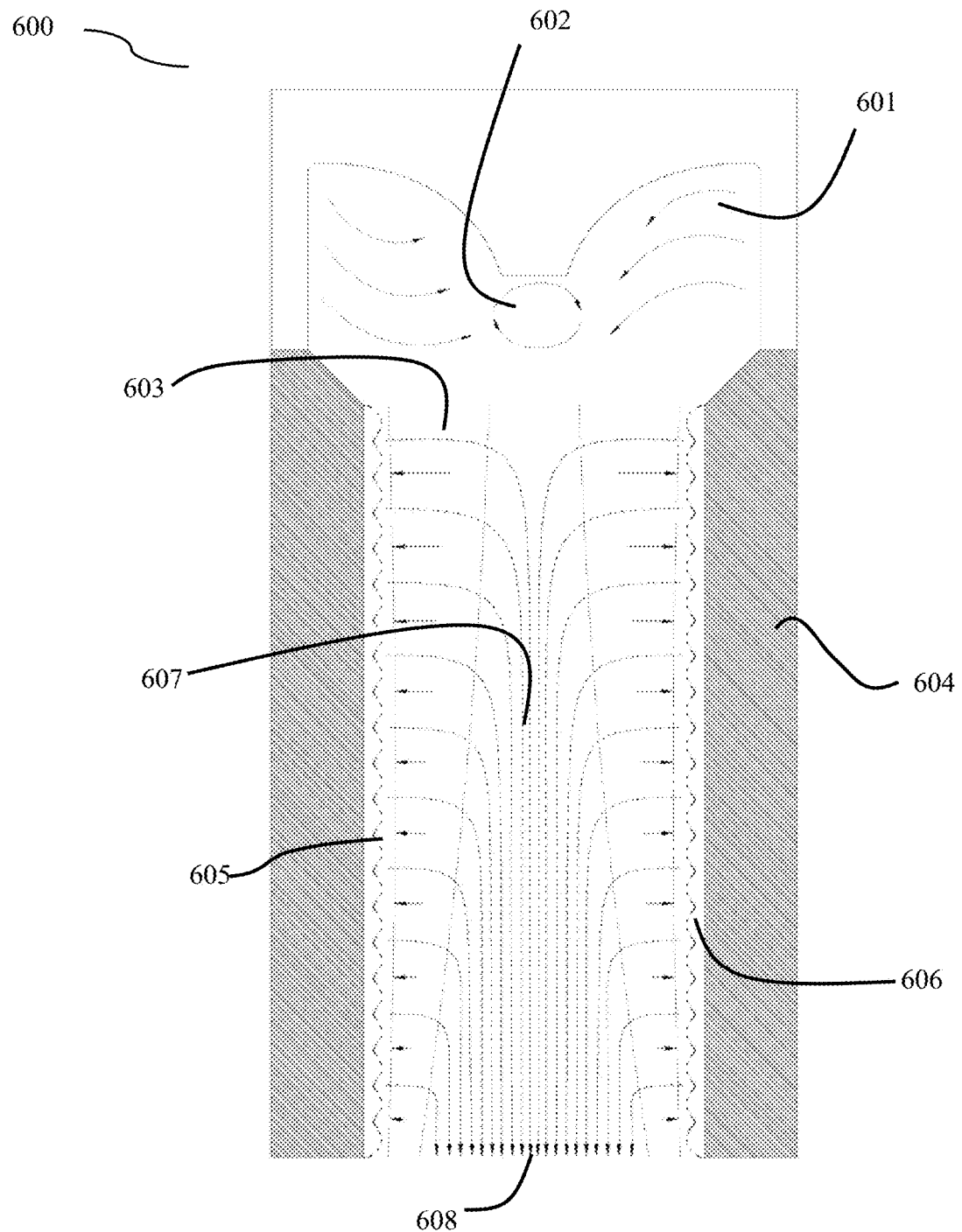
FIG. 6 illustrates the effects of a vortex flow inside of an example engine on a combustion reaction inside of the engine.

In one implementation of the injector 110, the axial flow of the injection fluid from a tank, e.g., tank 124 of FIG. 1, flows into the primary feed lines 116 that begin the redirection of the injection fluid flow 502. The injector 110 then routes the flow through the pre-swirl chamber 114 where the axial flow velocity is translated into a centrifugal flow velocity. The pre-swirl chamber 114 then evenly distributes the flow through the injection orifices 112. This distribution further accelerates the flow of the injection fluid in a tangential flow pattern to the inner sidewall 502 of the injection chamber 504 as well as in a generally perpendicular flow path to the primary axis of the engine. In FIG. 6, arrows pointing from the primary feed lines 116 to the interface 502 to the pre-swirl chamber 114 to injection orifices 112 and finally to the injection chamber 504 illustrate the direction of the flow path.

While accelerating the flow, the injection orifices 112 atomize the injection fluid into a gas or microdroplet form so that the injection fluid can evenly mix with either a solid fuel grain or a solid oxidizer. The atomized fluid flow field then flows in a high velocity vortex flow field in which a majority of the flow's velocity may be centrifugal with a minimal axial flow component. This high velocity vortex flow produces a low-pressure zone at the center of the vortex in the injection chamber 604. This low-pressure zone can produce a Carnot cycle, e.g., the Carnot cycle 310 of FIG. 3, that pulls heat from the center of a combustion port into the injection chamber 604. The Carnot cycle 310 increases the injected fluid's temperature which in turn increases the stability of a burn as the combustion reaction is not shocked due to the temperature differential between the injection fluid and the combustion reaction. The temperature differential can be over 3000 degrees Kelvin. When the vortex flow enters a solid propellant grain 120, e.g., fuel grain or solid oxidizer, the combustion reactants are contained in the outer vortex flow field, which is forced against the wall of the solid propellant grain during combustion. Decreasing a boundary layer between the solid propellant grain or the solid oxidizer and a flame wall increases the regression rate of the solid fuel grain or oxidizer.

FIG. 6 illustrates the effects of a vortex flow inside of an example engine on a combustion reaction inside of the engine. As the injection fluid 601 is injected into the engine, the fluid 601 begins to produce the centrifugal flow pattern 602. In one implementation, oxidizer may be the injection fluid. As oxidizer travels down the engine, the highest concentration of oxidizer is contained in the oxidizer rich vortex zone 603, the triangularly shaped section illustrated in FIG. 6 that gets smaller as the flow continues down the port. The highest concentration of oxidizer is contained in this section due to the centrifugal flow forcing the flame wall 605 closer to the fuel grain 604 throughout the entire length of the engine. This flame wall 605 formation maintains a consistent distance from the wall of the fuel grain 604 ensuring that the grain 604 burns evenly throughout its full length. The flame wall also increases the regression rate by improving heat transfer through the fuel rich out flame zone 606. At the center of the engine port is a low-pressure zone 607 to which exhaust gasses 608 flow after the combustion reactants have mixed and combusted. This transition of exhaust gasses 608 causes a self-sustaining vortex 602 as the exhaust gasses 608 force the vortex flow 602 and 603 to stay close to the wall of the fuel grain 604.

Once the reactants enter the center of the vortex and translate to an axial fluid flow, the combustion products flow down the center of the grain and out of the nozzle.

The injector and the linear throttle can be manufactured out of material with a high resistance to high temperatures, pressures, and ablation. For example, they can be made out of aluminum, stainless steel, or titanium.

Figure 7:
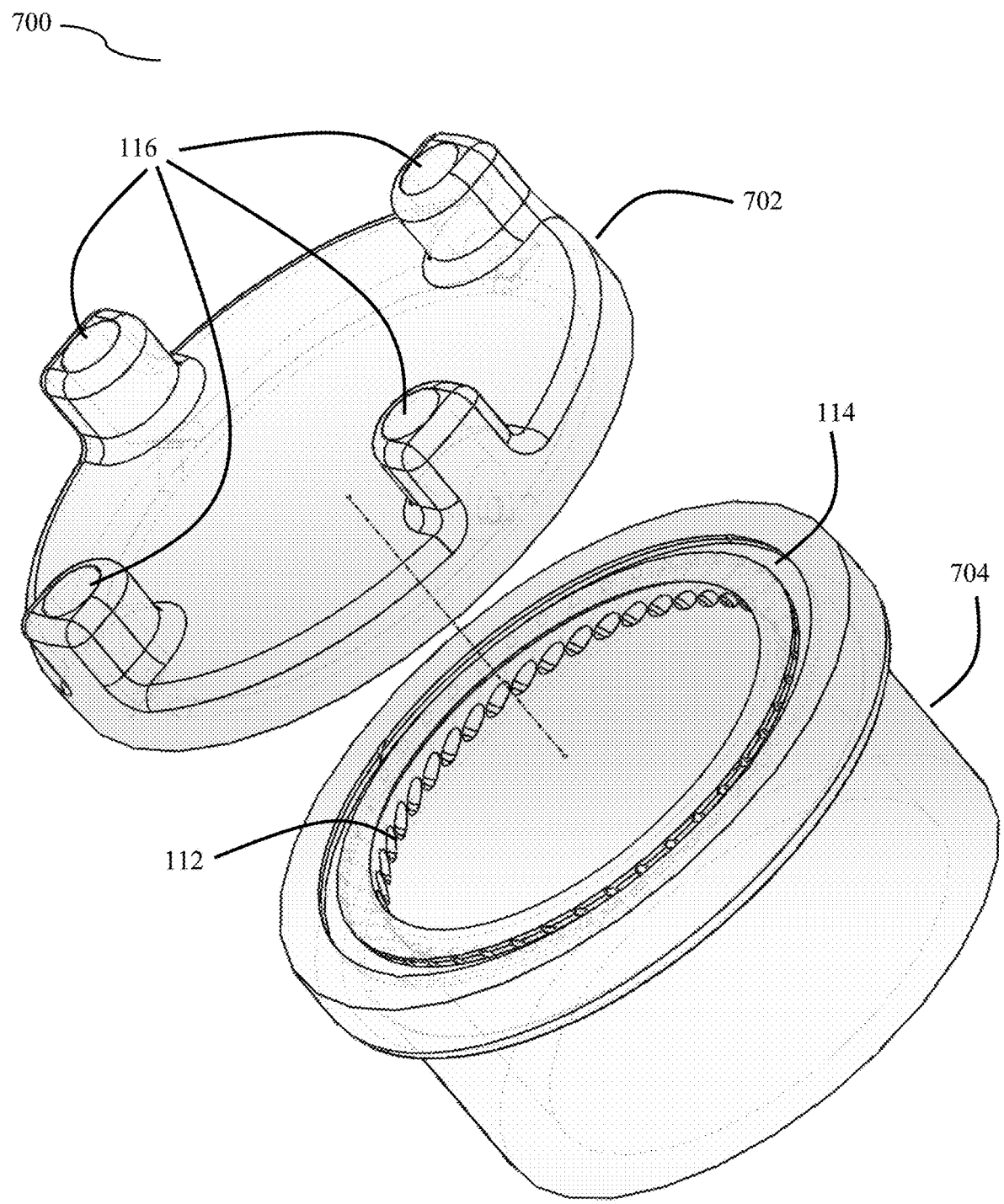
FIG. 7 illustrates an injector made with multiple parts.

In one implementation, a manufacturing process can make the injector as a single part using metal free-form additive manufacturing. The injector, e.g., injector 110, may not physically be made as one piece unless using additive manufacturing because of the uniquely-shaped structures inside of the injector. In another implementation, a more traditional subtractive manufacturing process can make the injector using multiple pieces and assembling them together as illustrated in FIG. 7. FIG. 7 illustrates an injector, e.g., injector 110, made with multiple parts. The injector of FIG. 7 has a top component 702 and a bottom component 704.

Figure 8A:
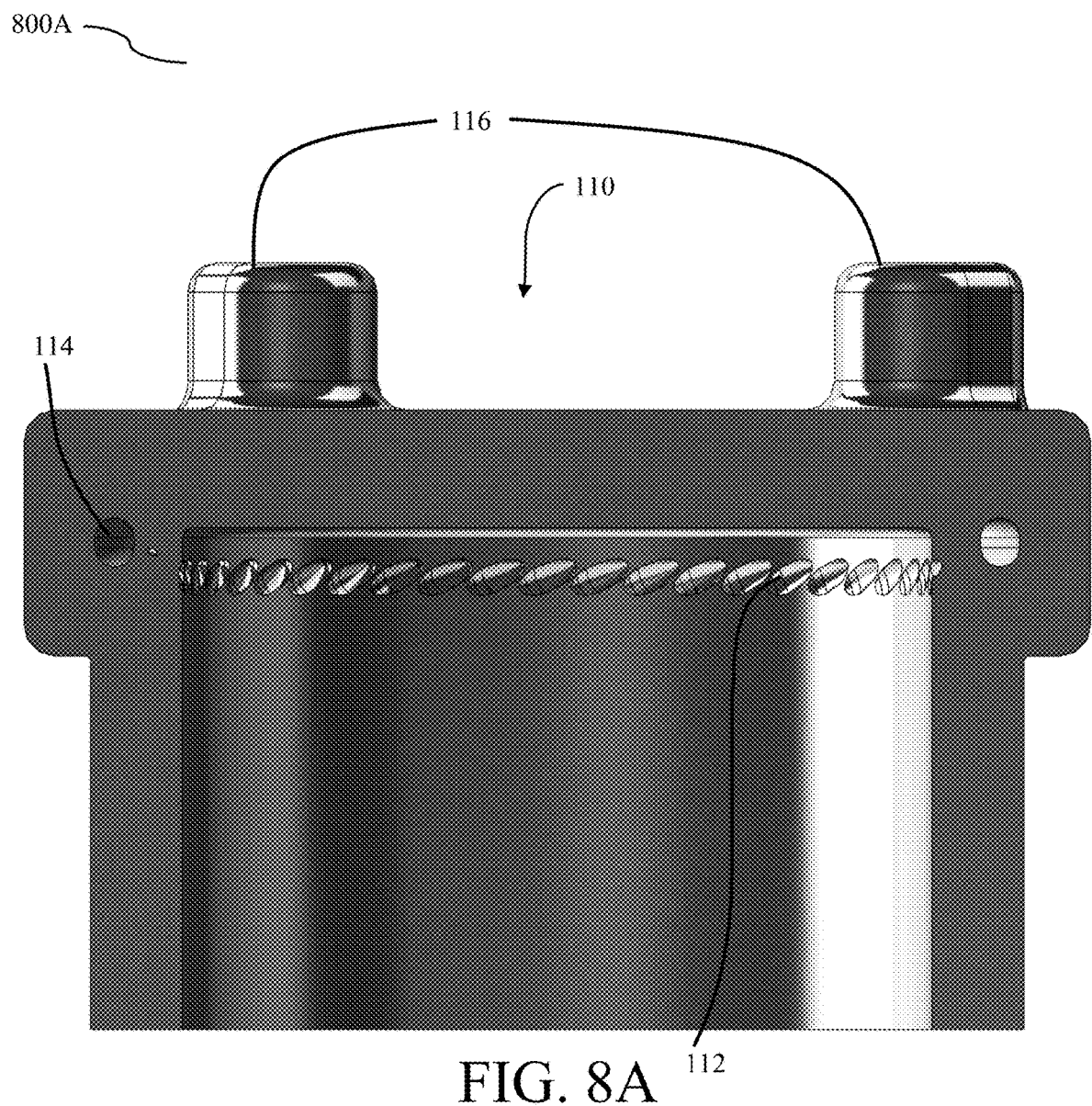
FIG. 8A illustrates an injector with a flat ceiling.
Figure 8B:
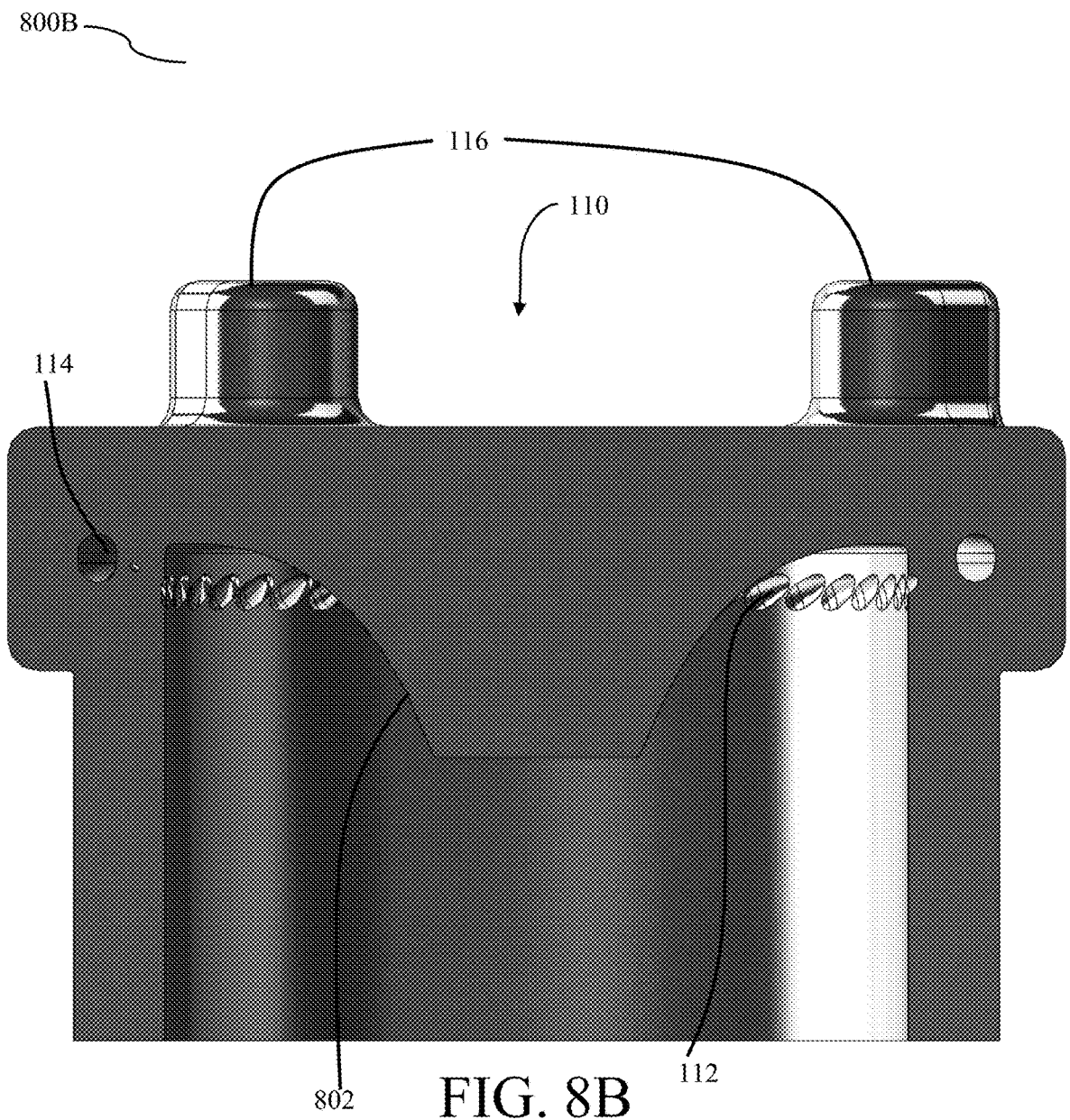
FIG. 8B illustrates an injector with a central truncated spike to retain and distribute heat brought up by a Carnot cycle.
Figure 8C:
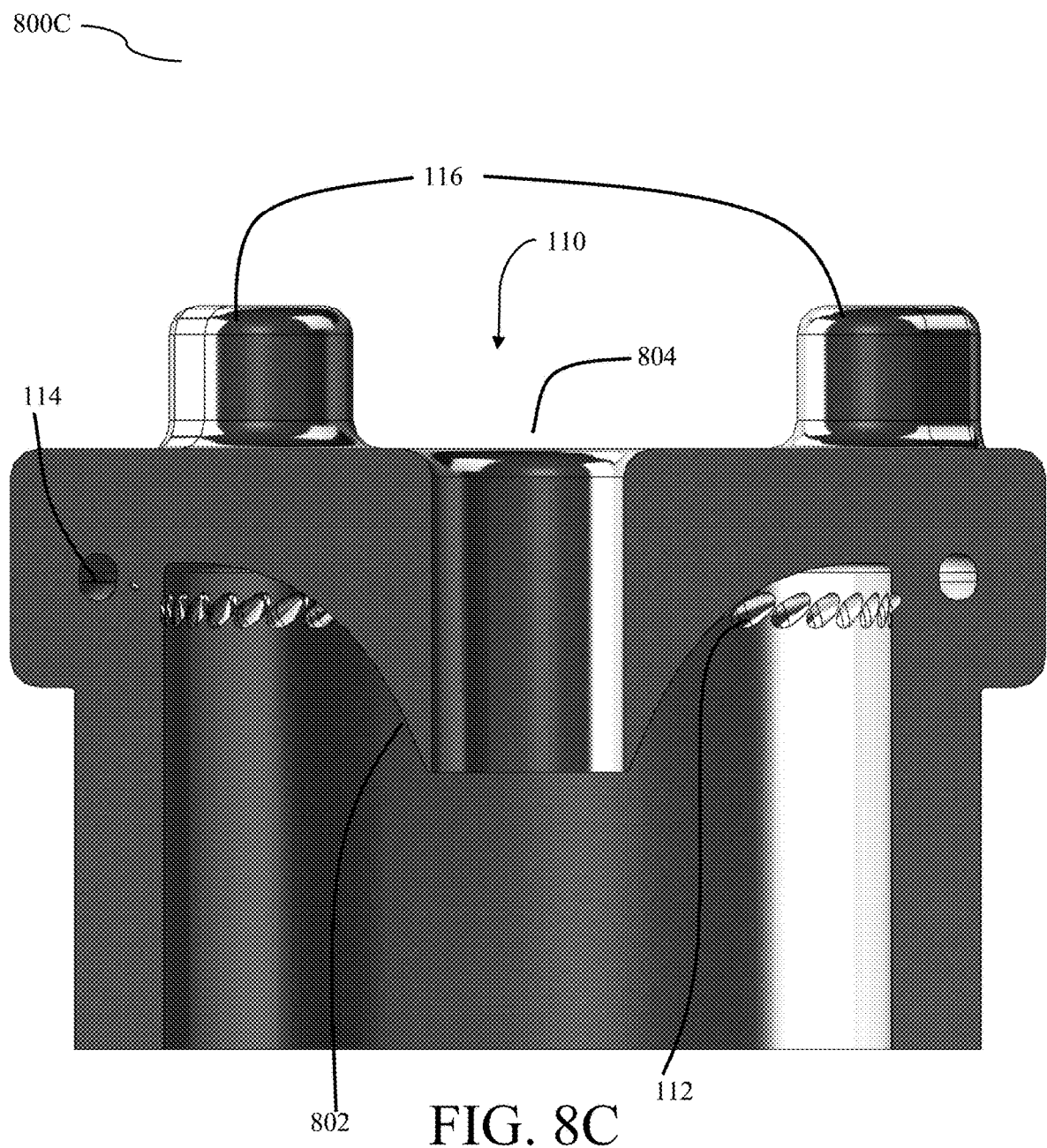
FIG. 8C illustrates an injector with a central truncated spike and a central hole.

Other implementations of the injector are contemplated that provide different advantages. For example, FIG. 8A illustrates an injector with a flat ceiling for ease of manufacturing and simplicity. FIG. 8B shows an injector with a central truncated spike 802 to retain and distribute heat brought up by a Carnot cycle. FIG. 8C illustrates an injector with a central truncated spike 802 that retains and distributes heat from a Carnot cycle. The injector also has a central hole 804 allowing for the addition of an enhancer for enhancing engine performance.

An enhancer can be an ignition system for the engine. The ignition system that is installed need only produce enough heat to increase the temperature of the grain material over that of its combustion point. This temperature can be achieved with a single use pyrogenic system such as a small solid rocket engine for single use ignition, or with a more complicated restartable ignition system. An example of a restartable ignitor is that of a catalyst system where the oxidizer passes through a catalyst that induces decomposition which produced sufficient heat to ignite the grain.

Figure 8D:
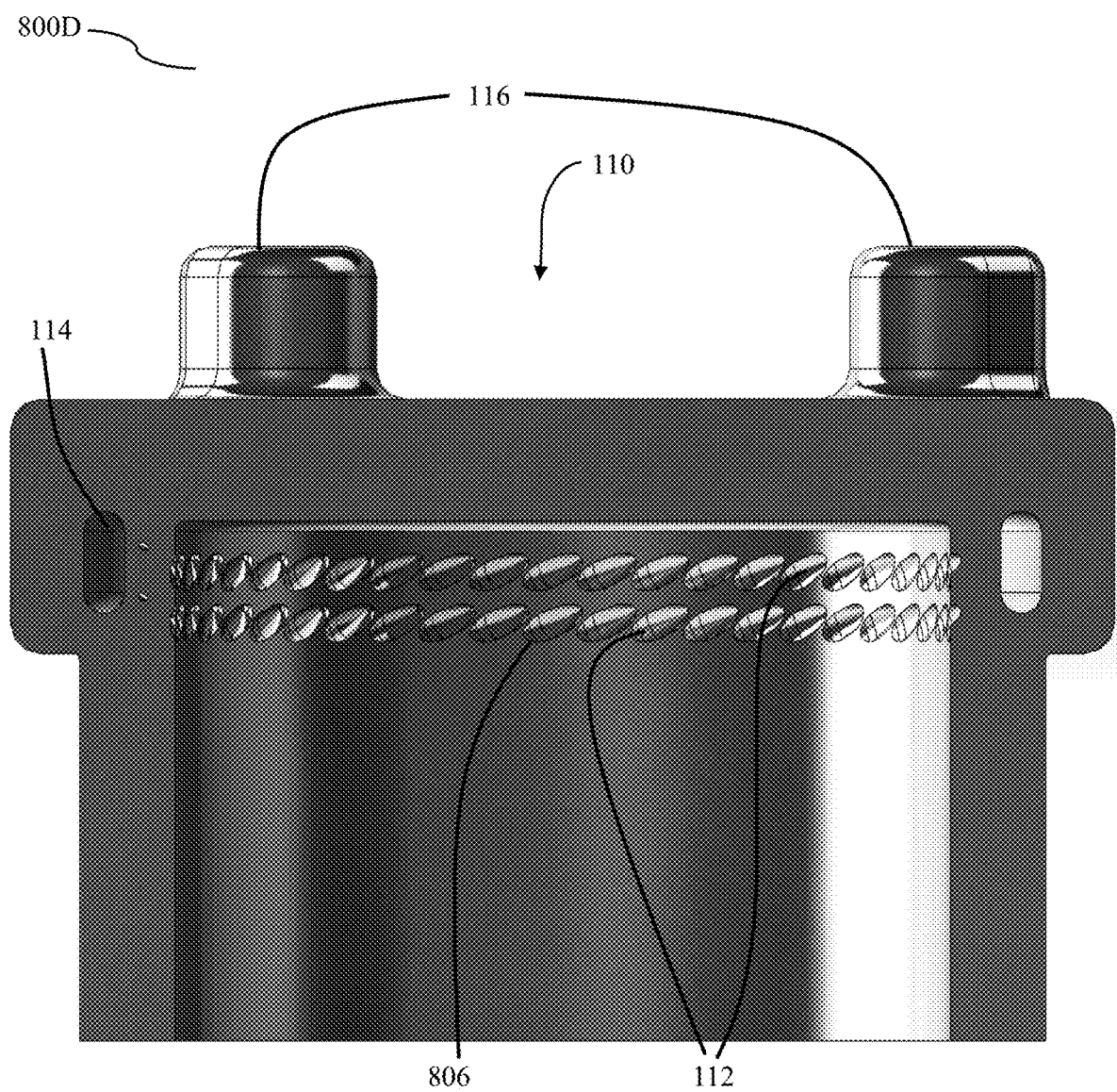
FIG. 8D illustrates an injector with a pre-swirl chamber that has increased injection orifice capacity by stacking.
Figure 8E:
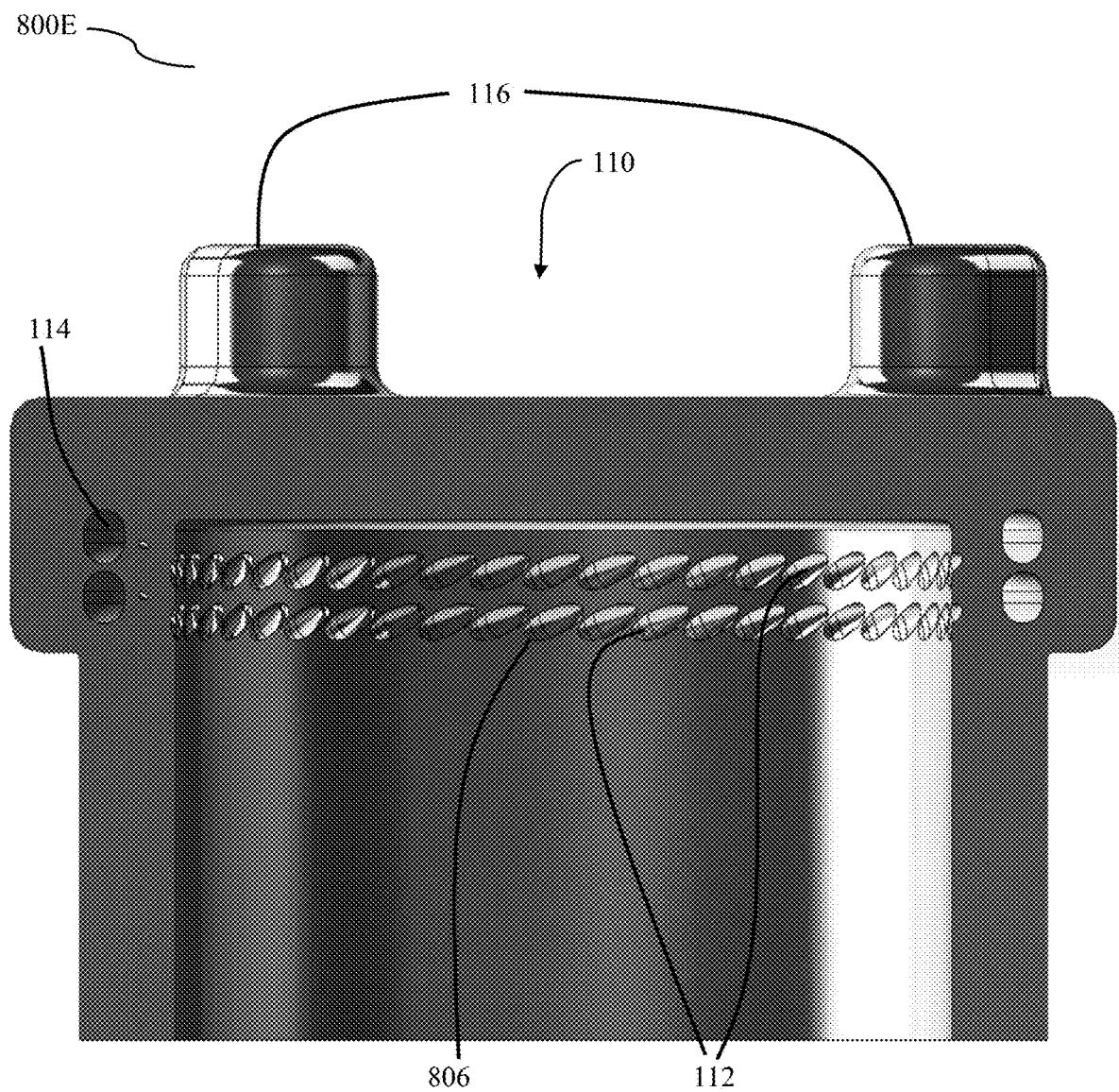
FIG. 8E illustrates an injector with a pre-swirl chamber that is split into two separate chambers for injecting two different injection fluids.

Additionally, the hole can be used for an enhancer such as a preburner system not unlike the disclosure in Bradford et al., "Hybrid Rocket Combustion Enhancement." U.S. Pat. No. 5,582,001, issued Dec. 10, 1996. This preburner can also be used to ignite the engine if the preburner temperature is sufficiently above the ignition temperature of the grain material. FIG. 8D illustrates an injector with a pre-swirl chamber 114 with increased injection orifice capacity by stacking. This injector allows a second row of injection orifices 806 to be placed below the primary row of injection orifices 112. To use the injector with two or more liquid or gaseous combustion reactants, the pre-swirl chamber 114 can be split into two or more separate chambers as illustrated in FIG. 8E. By splitting the pre-swirl chamber into separate chambers, different unique fluids can be injected into the injection chamber without mixing before being placed into the engine. This configuration may also use stacked orifices, e.g., orifices 806.

Figure 9:
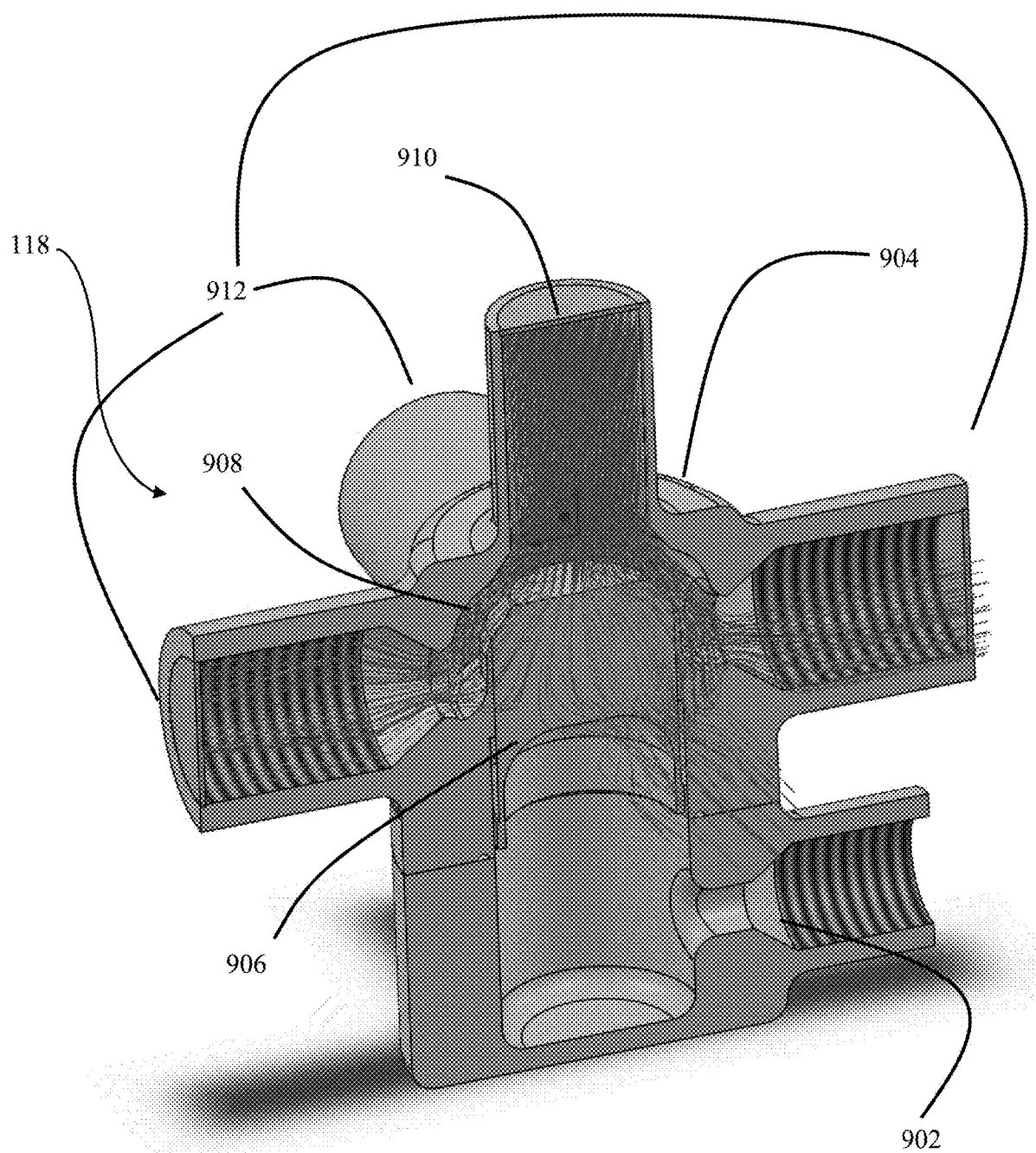
FIG. 9 illustrates a linear throttle with injection fluid flow.

FIG. 9 illustrates a linear throttle valve 118. In one implementation, the throttle 118 can be actuated with a pneumatic system 902. In another implementation the throttle 118 can be actuated through use of an electric motor or another form of actuation system known to one of ordinary skill in the art.

The throttle 118 itself is comprised of two primary components: the throttle body 904 and the piston cylinder 906. By actuating the cylinder up and down, the total cross-sectional area of the throttle 118 changes in a linear relation to the position of the cylinder resulting in a linear change in fluid flow 908 during action. As illustrated, position of the throttle 118 is inline with the flow inlet axis 910. In this implementation, the throttle has outlets 912 to which the flow can be redistributed. However, a throttle 118 can have more or less than four outlets. When the flow 908 is redirected to the off-axis outlets, the flow is transitioned with no stagnation points due to the natural flow transitions caused by the alignment of the piston 806 with the throttle-body 904.

Figure 10A:
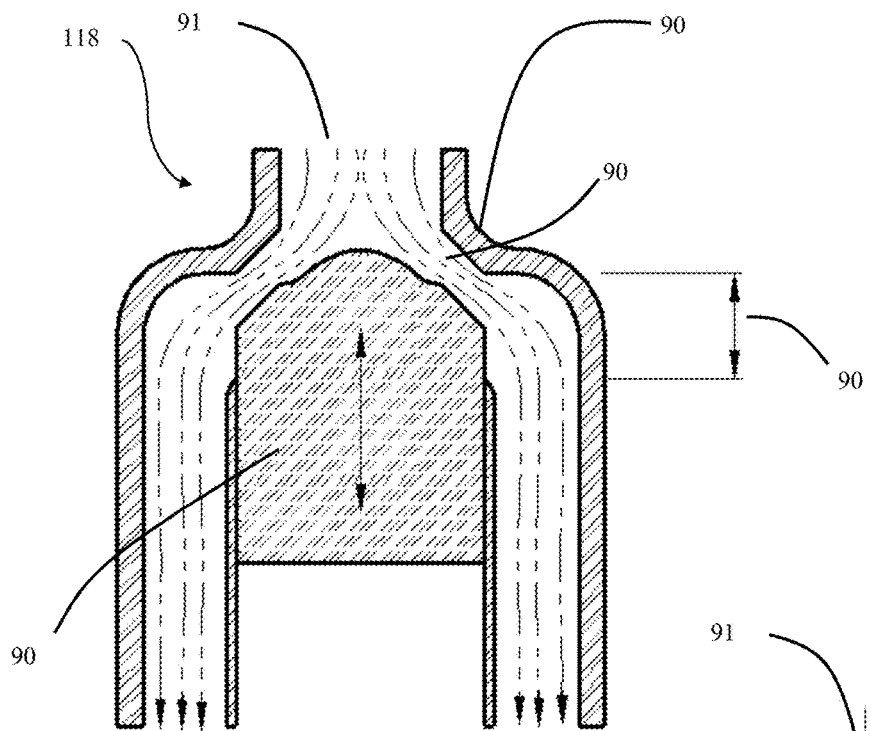
FIG. 10A illustrates the interaction of a fluid flow through a throttle body.
Figure 10B:
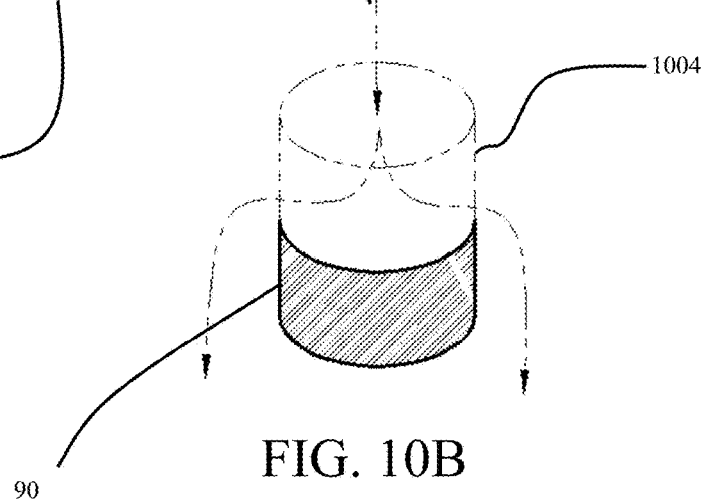
FIG. 10B illustrates the interaction of a fluid flow through a throttle body.

FIGS. 10A and 10B further illustrate the interaction of the fluid flow 1008 through the throttle body 804 while the actuation of the piston cylinder 906 redirects the flow 1008 through the outlets 912 and regulates the flow in accordance with the amount of cross-sectional area of the cylindrical flow area 904. As the piston cylinder 906 actuates downward 902, the cross-sectional area 904 increases in a linear relation to its position that increases the flow 808 in a direct linear relation. The opposite occurs when the piston cylinder 806 actuates in the opposite direction 902.

Figure 11:
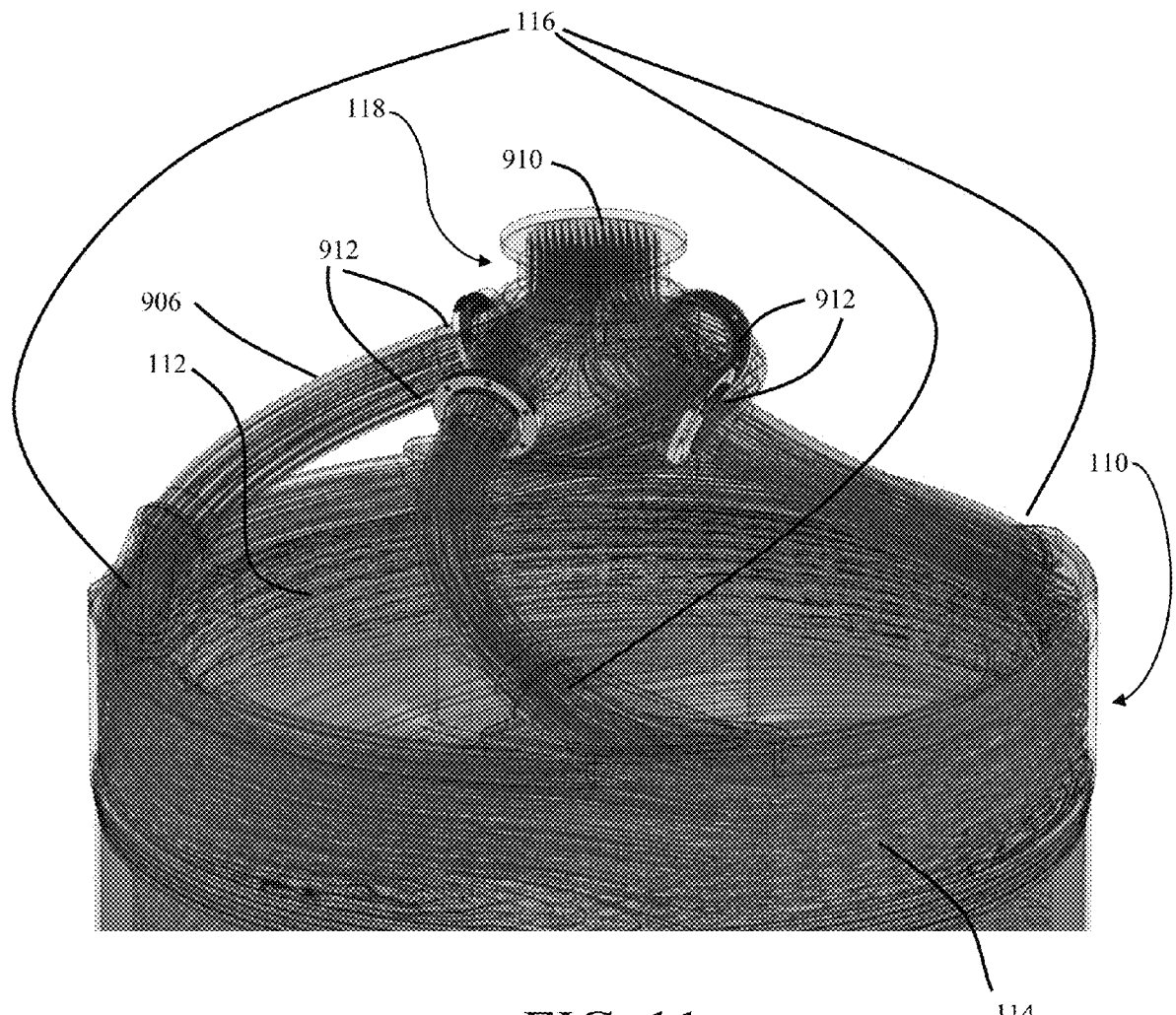
FIG. 11 illustrates integration of a throttle with a vortex injector.

The integration of a purpose-built linear throttle 118 with the vortex injector 110 designed for integration with the throttle is illustrated in FIG. 11. Where the outlets 912 of the throttle 118 are positioned such that the outlets redirect the flow 906 in a smooth transition to the inlets 116 of the injector 110. The flow 906 then may follow a smooth transitional path into the pre-swirl chamber 114 through the injection orifices 112 and into the engine.

Figure 12:
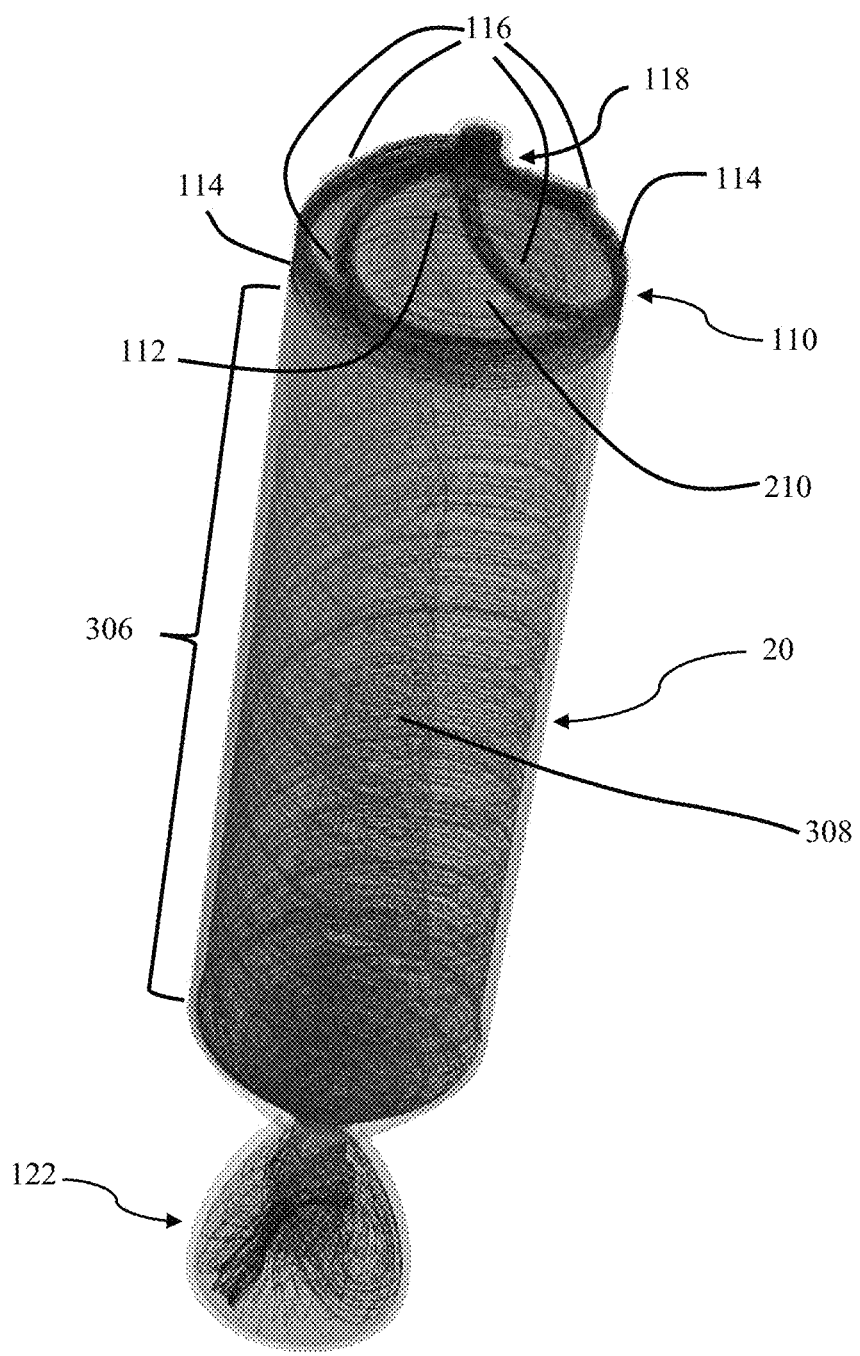
FIG. 12 illustrates an injection fluid flow through a throttle valve to an injector and into a solid propellant grain.

FIG. 12 illustrates an injection fluid flow through a throttle valve 118 to an injector 110 and into a solid propellant grain 120, e.g., fuel grain or oxidizer. This flow increases the regression rate of fuel, which produces a greater level of thrust for a smaller engine. The vortex flow field is self-sustaining because the engine harnesses the effects of the Carnot cycle where there is a nested vortex of combustion reactants that are ejected linearly down the center of the engine at the lowest pressure point. As a result, the combustion reaction maintains a continuous centrifugal flow path down the entire length of the engine and out through the nozzle 122.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A vortex injector in a hybrid rocket engine, the hybrid rocket engine having a fuel grain generally surrounding a centrally located combustion chamber, the vortex injector comprising:
    one or more primary feed lines that receive axial flow of an injection fluid;
    an injection chamber, configured to be operatively located upstream of the combustion chamber and the fuel grain, prior to combustion processes,
    one or more injection orifices that distribute injection fluid to the injection chamber to introduce the injection fluid into the injection chamber for subsequent passage to the combustion chamber;
    a pre-swirl chamber, that transforms axial flow of the injection fluid into a centrifugal flow and distributes the centrifugal flow of the injection fluid to the one or more injection orifices to generate a substantially circumferential swirl to the injection fluid;
    an interface that routes the axial flow of the injection fluid from the one or more primary feed lines to the pre-swirl chamber; and
    a central spike protruding into the injection chamber and absorbing heat of combustion to function in operation as a heat source to pre-heat the injection fluid;
    the vortex injector thereby establishing a Carnot cycle within the injection chamber to increase the temperature of the injected fluid prior to introduction into the combustion chamber.

2. The vortex injector of claim 1, wherein the interface between the one or more primary feed lines and the pre-swirl chamber begins redirection of the axial flow of the injection fluid to an off-axis flow to initiate a direction change in the direction of pre-swirl induced by the pre-swirl chamber.

3. The vortex injector of claim 1, wherein the one or more injection orifices atomize the injection fluid.

4. The vortex injector of claim 1, wherein the central spike is truncated.

5. The vortex injector of claim 1, wherein the injector includes a central hole for installation of at least a preburner system or ignition system.

6. A linear throttle valve in a hybrid rocket engine, the throttle valve having an axis of flow for injection fluid into a combustion chamber of the hybrid rocket engine, comprising:
    an inlet passing the injection fluid in a direction generally aligned with the axis of flow and having an inlet cross sectional area;
    a generally cylindrical piston that actuates up and down in a linear manner in line with the axis of inlet flow for injection fluid passed through the inlet; and
    a generally cylindrical chamber housing the piston and interacting with the piston to redirect the injected fluid; wherein by linearly actuating the cylindrical piston, the injection fluid changes its volumetric rate in a linear relation to the cylindrical piston's position;
    plural output ports receiving the chamber output of the injection fluid and being configured to supply the injection fluid to the hybrid rocket engine, each output port having a generally constant cross-sectional area along its entire length, the output ports being generally uniformly disposed around the axis of inlet flow and the total cross sectional area of the outlet ports being substantially equal to the cross sectional area of the inlet,
    the valve being thereby configured to cause a fluid flow path of a generally constant cross-sectional area so as to minimize pressure drop and uneven flow distribution to reduce flow turbulence.

7. The linear throttle valve of claim 6, wherein the cylindrical piston is actuated with a pneumatic system.

8. The linear throttle valve of claim 6, wherein the cylindrical piston is actuated with an electric motor.

9. The linear throttle valve of claim 6, wherein the linear throttle valve is coupled with a vortex injector.

10. The linear throttle valve of claim 6, wherein the at least one outlet port of the linear throttle valve is positioned so that the at least one outlet port redirects injection fluid flow to at least one inlet of the vortex injector.

11. A hybrid rocket engine with a vortex flow field injection system that produces a high-speed sustained vortex flow field, the hybrid rocket engine comprising:
    a generally cylindrical injection chamber operatively located upstream of a combustion chamber having a solid propellant grain provided therein, the injection chamber having an inner circumference to comprise an outer edge of the solid propellant grain in the hybrid rocket engine;
and
    an injection system provided in the injection chamber and including a throttle valve and an injector that injects injection fluid into the injection chamber through plural injection orifices and produces a vortex flow-field for the injected fluid; the injector including,
        one or more primary feed lines that distribute the injection fluid,
        a pre-swirl chamber which receives the injection fluid from said primary feed lines, induces a centrifugal flow in said injection fluid and distributes the centrifugal flow of the injection fluid to the one or more injection orifices to generate a substantially circumferential swirl to the injection fluid and the plural orifices being provided along an inner edge of the injection chamber and providing a centrifugal flow of the primary fluid into the injection chamber to thereby transfer the injection fluid, the injection system thereby supplying injection fluid into the engine, the injection system including a central spike protruding into the injection chamber and absorbing heat of combustion to function in operation as a heat source to pre-heat the injection fluid;

the injection system thereby establishing a Carnot cycle within the injection chamber to increase the temperature of the injected fluid prior to introduction into the combustion chamber.

12. The hybrid engine of claim 11, wherein each orifice of the plural orifices has a converging section.

13. The hybrid engine of claim 11, wherein each orifice of the plural orifices has a diverging section.

14. The hybrid engine of claim 11, wherein each orifice of the plural orifices has a converging and diverging section.

15. The hybrid engine of claim 11, wherein the injection chamber is closed off at the top of the chamber and the central spike is a truncated conical spike at the center of the chamber to direct the centrifugal flow ejected from each of the plural orifices down a primary axis of the hybrid engine.

16. The hybrid engine of claim 15, wherein the spike has a hole passing through it, allowing for the insertion of an ignition system.

17. The hybrid engine of claim 16, wherein the hole allows the insertion of a preheater.

18. The engine of claim 11, wherein the plural orifices are arranged in plural ring layers, at least one ring layer of orifices injecting a different combustion reactant than the orifices of another ring layer.

19. A rocket comprising the hybrid rocket engine of claim 11.

20. The hybrid rocket engine of claim 11 wherein the throttle valve is a linear throttle valve including, a generally cylindrical piston that actuates up and down in a linear manner in line with an axis of inlet flow for injection fluid, and a generally cylindrical chamber connected to the piston that redirects the injected fluid; wherein by linearly actuating the cylindrical piston, the injection fluid changes its volumetric rate in a linear relation to the cylindrical piston's position.

21. The hybrid rocket engine of claim 20, wherein the linear throttle valve is positioned in line with a flow inlet axis.

* * * * *